(12) United States Patent
Tikhostoup et al.

(10) Patent No.: US 12,554,545 B2
(45) Date of Patent: Feb. 17, 2026

(54) DYNAMIC ALLOCATION OF PLATFORM RESOURCES

(71) Applicants: ADVANCED MICRO DEVICES, INC., Santa Clara, CA (US); ATI TECHNOLOGIES ULC, Markham (CA)

(72) Inventors: Dmitri Tikhostoup, Markham (CA); Daniel Waihim Wong, Santa Clara, CA (US); William Herz, Santa Clara, CA (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 626 days.

(21) Appl. No.: 17/487,103

(22) Filed: Sep. 28, 2021

(65) Prior Publication Data

US 2023/0094384 A1    Mar. 30, 2023

(51) Int. Cl.
    *G06F 9/50* (2006.01)
(52) U.S. Cl.
    CPC ................... *G06F 9/5044* (2013.01)
(58) Field of Classification Search
    CPC .................................................. G06F 9/5044
    USPC ........................................................ 718/104
    See application file for complete search history.

(56) References Cited

U.S. PATENT DOCUMENTS

| | | | |
|---|---|---|---|
| 8,358,876 B1 | 1/2013 | Gilra et al. | |
| 10,818,279 B1 | 10/2020 | Swanson et al. | |
| 10,853,148 B1 | 12/2020 | Kenney et al. | |
| 11,397,658 B1* | 7/2022 | Pang | G06F 11/3433 |
| 11,663,050 B2* | 5/2023 | Peng | G06T 1/60 |
| | | | 718/104 |
| 2003/0095135 A1 | 5/2003 | Kaasila et al. | |
| 2006/0077213 A1 | 4/2006 | Li | |
| 2008/0016512 A1* | 1/2008 | Doi | G06F 8/60 |
| | | | 718/106 |
| 2009/0310016 A1 | 12/2009 | Fukuda et al. | |
| 2010/0149216 A1 | 6/2010 | Dutta et al. | |
| 2010/0153956 A1 | 6/2010 | Capps, Jr. et al. | |
| 2010/0329564 A1 | 12/2010 | Hervas et al. | |

(Continued)

OTHER PUBLICATIONS

International Search Report and Written Opinion, PCT/US2022/043606, Jan. 31, 2023, 14 pages.

(Continued)

*Primary Examiner* — Sisley N Kim

(57) ABSTRACT

A dynamic allocator for providing platform resource candidates is disclosed. In an implementation, a platform resource allocator receives a request from a workload initiator such as, an application, for a platform resource recommendation. The platform resource allocator analyzes performance capabilities and utilization metrics of a plurality of platform resources for each of a plurality of resource. The plurality of platform resources includes one or more graphics processor units (GPUs) and one or more accelerated processing units (APUs). The platform resource allocator dynamically provides the platform resource recommendation to the workload initiator to select one or more of the plurality of platform resources to execute a workload based on the performance capabilities and utilization metrics.

20 Claims, 18 Drawing Sheets

(56) References Cited

U.S. PATENT DOCUMENTS

| | | | |
|---|---|---|---|
| 2011/0239220 A1* | 9/2011 | Gibson | G06F 1/3206 718/103 |
| 2012/0162234 A1 | 6/2012 | Blinzer et al. | |
| 2012/0173709 A1* | 7/2012 | Li | G06F 9/5011 709/224 |
| 2013/0283286 A1* | 10/2013 | Lee | G06F 9/5027 718/104 |
| 2014/0176583 A1 | 6/2014 | Abiezzi et al. | |
| 2014/0244804 A1 | 8/2014 | Mng et al. | |
| 2014/0298349 A1* | 10/2014 | Jackson | G06F 1/3206 718/104 |
| 2015/0271491 A1 | 9/2015 | Wang | |
| 2015/0286935 A1* | 10/2015 | Mukherjee | G06F 9/45558 706/46 |
| 2017/0317945 A1* | 11/2017 | Guo | H04L 47/83 |
| 2019/0121674 A1* | 4/2019 | Chen | G06F 9/5033 |
| 2020/0014273 A1 | 1/2020 | Ogawa et al. | |
| 2020/0142735 A1* | 5/2020 | Maciocco | G06F 21/602 |
| 2020/0167361 A1 | 5/2020 | Princehouse et al. | |
| 2020/0304752 A1 | 9/2020 | Aluru et al. | |
| 2020/0409762 A1* | 12/2020 | Branover | G06F 9/4831 |
| 2021/0117217 A1* | 4/2021 | Croteau | G06F 11/3409 |
| 2021/0124615 A1 | 4/2021 | Klingenbrunn et al. | |
| 2021/0144066 A1* | 5/2021 | Marinucci | H04L 41/147 |
| 2021/0149785 A1 | 5/2021 | Li et al. | |
| 2021/0158629 A1 | 5/2021 | Breugelmans et al. | |
| 2021/0232399 A1* | 7/2021 | Yang | G06F 9/5027 |
| 2022/0116660 A1 | 4/2022 | Walker et al. | |
| 2022/0309314 A1 | 9/2022 | Park et al. | |
| 2022/0334891 A1 | 10/2022 | Fontaine | |
| 2023/0161632 A1 | 5/2023 | Herz et al. | |

OTHER PUBLICATIONS

International Search Report and Written Opinion, PCT/US2022/044565, Jan. 13, 2023, 12 pages.

Xu et al., "Scaling Up Data-Parallel Analytics Platforms: Linear Algebraic Operation Cases," Published in: 2017 IEEE International Conference on Big Data (Big Data), Date of Conference: Dec. 11-14, 2017, Boston, MA, USA, DOI: 10.1109/BigData.2017.8257935, Date Added to IEEE Xplore: Jan. 15, 2018, 10 pages.

Fan, "Optimizing Image Sharpening Algorithm on GPU," 2015 44th International Conference on Parallel Processing, Beijing, China, Date of Conference: Sep. 1-4, 2015, Date Added to IEEE Xplore: Dec. 10, 2015, DOI: 10.1109/ICPP.2015.32, 10 pages.

Freedman et al., "Image and Video Upscaling from Local Self-Examples," ACM Transactions on Graphics (TOG), vol. 30, Issue 2, https://doi.org/10.1145/1944846.1944852, Published: Apr. 22, 2011, 11 pages.

Raina et al., "Large-scale Deep Unsupervised Learning using Graphics Processors," ICML '09: Proceedings of the 26th Annual International Conference on Machine Learning, https://doi.org/10.1145/1553374.1553486, Published: Jun. 14, 2009, 8 pages.

* cited by examiner

Identify A Plurality Of Platform Resources Available To Perform An Upscaling Operation, Wherein The Plurality Of Platform Resources Includes At Least One Or More Graphics Processor Units (GPUs) And One Or More Accelerated Processing Units (APUs)
1110

Dynamically Assign Workloads Of The Upscaling Operation To One Or More Of The Plurality Of Platform Resources Based On At Least A Modality Of The Upscaling Operation
1120

Dynamically Assign Workloads Of The Upscaling Operation To The One Or More Of The Plurality Of Platform Resources Based On User Preferences
1310

Dynamically Assign Workloads Of The Upscaling Operation To The One Or More Of The Plurality Of Platform Resources Based On Performance Capabilities Of The One Or More Of A Plurality Of Platform Resources
1320

Process The Workloads Of The Upscaling Operation By The One Or More Of The Plurality Of Platform Resources Based On Dynamically Assigning The Workloads
1130

FIG. 13

DYNAMIC ALLOCATION OF PLATFORM RESOURCES

BACKGROUND

Computing systems often include a number of processing resources (e.g., one or more processors), which can retrieve and execute instructions and store the results of the executed instructions to a suitable location or output a computational result. A processing resource (e.g., central processing unit (CPU) or a graphics processing unit (GPU)) can comprise a number of functional units such as arithmetic logic unit (ALU) circuitry, floating point unit (FPU) circuitry, and/or a combinatorial logic block, for example, which can be used to execute instructions by performing logical operations on data (e.g., one or more operands). For example, functional unit circuitry can be used to perform arithmetic operations such as addition, subtraction, multiplication, and/or division on operands via a number of logical operations.

Applications executing on such computer systems can be given the opportunity to select a particular processing resource to execute a specific workload. For example, in a computing system that includes a CPU and one or more GPUs, the application can select a specific processor to execute an application workload. An application can determine what processing resources are resident in the computing system by querying the operating system of the computing system. In one example, a multimedia playback application can query the operating system for a list of devices capable of media playback and select, for example, a particular GPU for execution a video playback workload.

BRIEF DESCRIPTION OF THE DRAWINGS

FIG. 13 sets forth a flow chart illustrating another example method of compound processing of an upscaling operation in which assignment of workloads is carried out in a number of different ways in accordance with some implementations of the present disclosure.

DETAILED DESCRIPTION

Figure 1:
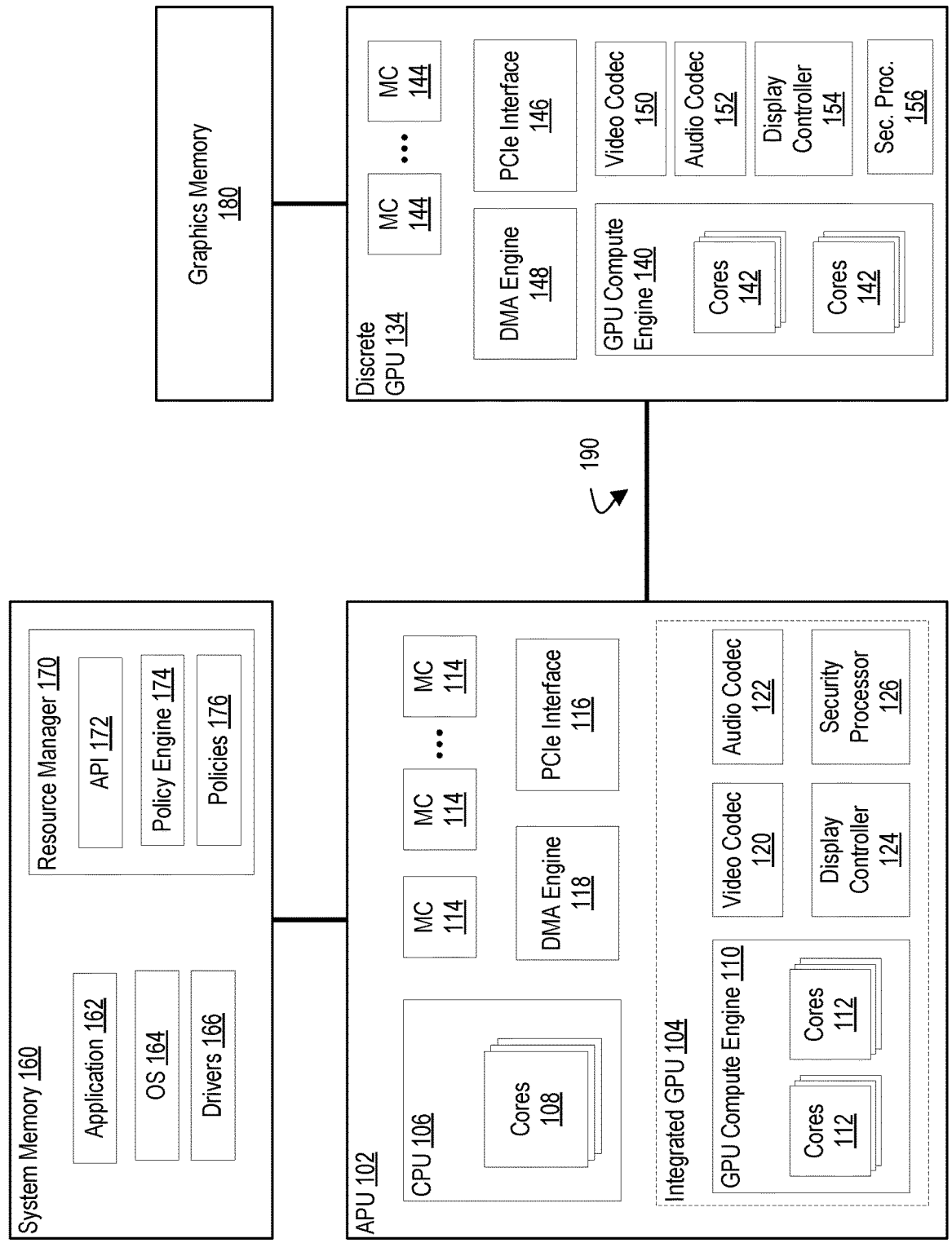
FIG. 1 sets forth a block diagram of an example system for providing a platform resource recommendation service in accordance with some implementations of the present disclosure.

As previously indicated, applications executing on a computer system can be given the opportunity to select a particular processing resource to execute a specific workload. In some scenarios, when an application is ready to assign a workload for execution, the application first queries the operating system to determine what processing resources are available. For example, if the workload is a graphics (e.g., graphics rendering for gaming) or multimedia workload (e.g., multimedia playback), the application can first determine whether a GPU is present in the computing device. In some computing devices, there can be more than one GPU present. For example, the computing device can include an integrated CPU and GPU while also including a discrete GPU (i.e., on a separate chip). Furthermore, the application can determine, for example, what video codecs are supported by the GPUs to determine where the workload can be placed. For example, a streaming media service player can describe a particular workload (e.g., a movie) in terms of source resolution, bit rate, codecs, display resolution, frame rate, etc., and query the operating system for processor resources capable of executing the workload. The operating system can respond by identifying the GPUs that have the ability to execute the workload. Based on the operating system's response, the application can select a GPU and assign the workload to that GPU. For example, the application can assign the workload to the integrated GPU because the integrated GPU typically consumes less power than the discrete GPU. This can be of particular concern when the computing device is operating on battery power.

However, when the operating system provides the information about the capabilities of the computing device, it does so without any insight as to the runtime behavior of the system. That is, the operating system does not know how busy the video codec of the integrated GPU is. If the application decides to place the workload on the integrated GPU, which can also be running other video workloads such a video conferencing application, the video codec of the integrated GPU can become oversubscribed. In other words, the application and the operating system do not have visibility as to the real runtime utilization of processor resources, and thus do not know if the computing device will be able to deliver the user experience expected for the workload.

Additionally, the operating system does not have a complete understanding of the actual platform resources (e.g., hardware) capabilities and limitations. In fact, some platform resource capabilities are non-discoverable by the operating system. Thus, an application can be assigned to a platform resource that is not the most suitable or optimal resources for processing the application.

In addition, data that defines image frames are typically scaled to a variety of sizes for presentation. That is, image scaling refers to resizing a digital image. Upscaling or "resolution enhancement" is the process of generating a high-resolution image from a low-resolution input. Upscaling presents an image in a higher resolution display. For example, a picture or a frame (e.g., an image) from a video stream be upscaled from a lower resolution to a higher resolution. The upscaled image can then be displayed on the display, e.g., so that the image fills the entire display. One of the challenges with upscaling is the comprehensive and exhaustive use of platform resources without taking into consideration the platform resources capabilities, availabilities, and limitations along with user preferences. Furthermore, a modality of an upscaling operation can negatively impact processing efficiency and power consumption.

Accordingly, implementations in accordance with the present disclosure provide a mechanism for platform resources recommendation service in which an application or other workload initiator can receive a platform resource recommendation to select one or more of a plurality of platform resources to execute a workload based on performance capabilities and utilization metrics.

An implementation is directed to a method of recommending platform resources. The method includes receiving a request from a workload initiator for platform resource candidates. The method also includes identifying one or more platform resource candidates based on the request and performance capabilities and utilization metrics of a plurality of platform resources, wherein the plurality of platform resources includes one or more GPUs and one or more accelerated processing units (APUs). It should be noted that the APU is considered to be a broad expression. For example, APU refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof. For example, an APU is a processing unit (e.g., processing chip/device) that can function both as a CPU and a GPU. Moreover, an APU is a chip that includes additional processing capabilities used to accelerate one or more types of computations outside of a general-purpose CPU. In one implementation, an APU can include a general-purpose CPU integrated on a same die with a GPU, a FPGA, machine learning processors, digital signal processors (DSPs), and audio/sound processors, or other processing unit, thus improving data transfer rates between these units while reducing power consumption. In some implementations, an APU can include video processing and other application-specific accelerators.

A GPU is a graphics and video rendering device for computers, workstations, game consoles, and similar digital processing devices. A GPU is generally implemented as a co-processor component to the CPU of the computer and can be provided in the form of an add-in card (e.g., video card), co-processor, or as functionality that is integrated directly into the motherboard of the computer or into other devices. The GPU can be a discrete GPU.

The method also includes dynamically providing the identified one or more platform resource candidates to the workload initiator. The term 'dynamic' or 'dynamically' is used in this specification to indicate that an action is carried out in an asynchronous, on-demand manner rather than statically. In this example, the 'providing' is said to be carried out dynamically in that platform resource candidates can be identified and provided to the workload initiator at any time, including during operation of the system. In this way, the resource candidates can be identified based on real-time current utilization and system composition rather than statically without any knowledge of current utilization.

In some implementations, the method also includes dynamically providing the identified one or more platform resource candidates based on non-performance capabilities and performance limitations of the plurality of platform resources. In some implementations, the method also includes collecting the performance capabilities, the utilization metrics, non-discoverable performance capabilities, and performance limitations for each of the plurality of platform resources in a platform resources library.

In some implementations, the method also includes consulting a platform resources library to determine non-discoverable performance capabilities, performance limitations, and historical performance data for each of the plurality of platform resources based on the request from the workload initiator for the platform resource recommendation. In some implementations, the method also includes monitoring the performance capabilities, the utilization metrics, non-discoverable performance capabilities, and performance limitations for each of the plurality of platform resources during start up or runtime of the workload.

In some implementations, the method also includes dynamically providing, during runtime of the workload, updated platform resource candidates based on adjusted performance capabilities and adjusted utilization metrics of the plurality of platform resources.

In some implementations, the method also includes ranking each of the plurality of platform resources based on the performance capabilities, the utilization metrics, non-discoverable performance capabilities, and performance limitations. In some implementations, the method also includes predicting a utilization impact to execute the workload for each of the one or more of the plurality of platform resources based on the performance capabilities, the utilization metrics, non-discoverable performance capabilities, and performance limitations. The performance capabilities can include operational modes of the plurality of platform resources, interconnection capabilities between the plurality of platform resources, power capabilities of the plurality of platform resources; and peripheral device capabilities. The plurality of processor resources can also include a local memory, a system memory, one or more peripheral devices, a display controller, a bus interface controller, a memory subsystem controller. Also, a GPUs can be a discrete GPU.

Another implementation is directed to an apparatus of providing platform resource candidates. The apparatus comprises a computer processor, a computer memory operatively coupled to the computer processor, the computer memory having disposed therein computer program instructions that, when executed by the computer processor, cause the apparatus to a request from a workload initiator for a platform resource recommendation. The request can include a description of a workload from a workload initiator. The computer program instructions also cause the apparatus to analyze performance capabilities and utilization metrics of a plurality of platform resources, wherein the plurality of platform resources includes one or more GPUs and one or more APUs. The computer program instructions also cause the apparatus to dynamically provide the identified one or more platform resource candidates to the workload initiator. In one aspect, the workload initiator provides a set of profiled workloads and select a workload type that fits/matches the capabilities of the platform resources or user settings.

The computer program instructions also cause the apparatus to consult a platform resources library to determine non-discoverable performance capabilities, performance limitations, and historical performance data for each of the plurality of platform resources based on the request from the workload initiator for the platform resource recommendation.

The computer program instructions also cause the apparatus to monitor the performance capabilities, the utilization metrics, non-discoverable performance capabilities, and performance limitations for each of the plurality of platform resources during start up or runtime of the workload. The computer program instructions also cause the apparatus to dynamically provide, during runtime of the workload, updated platform resource candidates based on adjusted performance capabilities and adjusted utilization metrics of the plurality of platform resources.

The computer program instructions also cause the apparatus to rank each of the plurality of platform resources based on the performance capabilities, the utilization metrics, non-discoverable performance capabilities, and performance limitations. The computer program instructions also cause the apparatus to predict a utilization impact for each of the one or more of the plurality of platform resources to execute the workload based on the performance capabilities, the utilization metrics, non-discoverable performance capabilities, and performance limitations.

Yet another implementation is directed to a computer program product of providing platform resource candidates. The computer program product is disposed upon a computer readable medium and comprises computer program instructions that, when executed, cause a computer to receive a request from a workload initiator for a platform resource recommendation. The request can include a description of a workload from a workload initiator. That is, the description can include a set of profiled workloads and to enable the workload initiator to select a workload type that fits/matches the capabilities of the platform resources or user settings.

The computer program instructions also cause the apparatus to analyze performance capabilities and utilization metrics of a plurality of platform resources, wherein the plurality of platform resources includes one or more GPUs and one or more APUs. The computer program instructions also cause the apparatus to dynamically provide the identified one or more platform resource candidates to the workload initiator.

An implementation is directed to a method of compound processing using platform resources. The method includes identifying a plurality of platform resources available to perform an upscaling operation, wherein the plurality of platform resources includes one or more GPUs and one or more APUs. The method also includes dynamically assigning workloads of the upscaling operation to one or more of the plurality of platform resources based on at least a modality of the upscaling operation. The method also includes processing the workloads of the upscaling operation by the one or more of the plurality of platform resources based on dynamically assigning the workloads.

In some implementations, the method also includes selecting the modality of the upscaling operation based on user preferences. In some implementations, the method also includes selecting the modality of the upscaling operation based on performance capabilities of the one or more of the plurality of platform resources.

In some implementations, the method also includes dynamically assigning workloads of the upscaling operation to the one or more of the plurality of platform resources based on performance capabilities of the one or more of a plurality of platform resources. In some implementations, the method also includes dynamically assigning workloads of the upscaling operation to the one or more of the plurality of platform resources based on user preferences. In some implementations, the method also includes dynamically assigning the workloads of the upscaling operation between a first platform resource and a second platform resources of the plurality of platform resources based on the modality of the upscaling operation, user preferences, and performance capabilities of the first platform resource and the second platform resources. In some implementations, the method also includes dynamically assigning a rendering operation, the upscaling operation, and a display operation of the workloads between the one or more of the plurality of platform resources based on the modality of the upscaling operation, user preferences, and performance capabilities of the one or more of the plurality of platform resources.

Another implementation is directed to an apparatus for compound processing using platform resources. The apparatus comprises a computer processor, a computer memory operatively coupled to the computer processor, the computer memory having disposed therein computer program instructions that, when executed by the computer processor, cause the apparatus to identify a plurality of platform resources available to perform an upscaling operation, wherein the plurality of platform resources includes one or more GPUs and one or more APUs. The computer program instructions also cause the apparatus to dynamically assign workloads of the upscaling operation to one or more of the plurality of platform resources based on at least a modality of the upscaling operation. The computer program instructions also cause the apparatus to process the workloads of the upscaling operation by the one or more of the plurality of platform resources based on dynamically assigning the workloads.

The computer program instructions also cause the apparatus to select the modality of the upscaling operation based on user preferences. The computer program instructions also cause the apparatus to select the modality of the upscaling operation based on performance capabilities of the one or more of the plurality of platform resources.

The computer program instructions also cause the apparatus to dynamically assign workloads of the upscaling operation to the one or more of the plurality of platform resources based on performance capabilities of the one or more of a plurality of platform resources. The computer program instructions also cause the apparatus to dynamically assign workloads of the upscaling operation to the one or more of the plurality of platform resources based on user preferences. The computer program instructions also cause the apparatus to dynamically assign dynamically assigning the workloads of the upscaling operation between a first platform resource and a second platform resources of the plurality of platform resources based on the modality of the upscaling operation, user preferences, and performance capabilities of the first platform resource and the second platform resources.

The computer program instructions also cause the apparatus to dynamically assign a rendering operation, the upscaling operation, and a display operation of the workloads between the one or more of the plurality of platform resources based on the modality of the upscaling operation, user preferences, and performance capabilities of the one or more of the plurality of platform resources.

Yet another implementation is directed to a computer program product for compound processing using platform resources. The computer program product is disposed upon a computer readable medium and comprises computer program instructions that, when executed, cause a computer to identify a plurality of platform resources available to perform an upscaling operation, wherein the plurality of platform resources includes one or more GPUs and one or more APUs. The computer program instructions also cause the computer to dynamically assign workloads of the upscaling operation to one or more of the plurality of platform resources based on at least a modality of the upscaling operation. The computer program instructions also cause the computer to process the workloads of the upscaling operation by the one or more of the plurality of platform resources based on dynamically assigning the workloads.

The computer program instructions also cause the computer to select the modality of the upscaling operation based on user preferences. The computer program instructions also cause the computer to select the modality of the upscaling operation based on performance capabilities of the one or more of the plurality of platform resources.

The computer program instructions also cause the computer to dynamically assign workloads of the upscaling operation to the one or more of the plurality of platform resources based on performance capabilities of the one or more of a plurality of platform resources. The computer program instructions also cause the computer to dynamically assign workloads of the upscaling operation to the one or more of the plurality of platform resources based on user preferences. The computer program instructions also cause the computer to dynamically assign dynamically assigning the workloads of the upscaling operation between a first platform resource and a second platform resources of the plurality of platform resources based on the modality of the upscaling operation, user preferences, and performance capabilities of the first platform resource and the second platform resources.

The computer program instructions also cause the computer to dynamically assign a rendering operation, the upscaling operation, and a display operation of the workloads between the one or more of the plurality of platform resources based on the modality of the upscaling operation, user preferences, and performance capabilities of the one or more of the plurality of platform resources.

Implementations in accordance with the present disclosure will be described in further detail beginning with FIG. 1. Like reference numerals refer to like elements throughout the specification and drawings. FIG. 1 sets forth a block diagram of an example system 100 for providing a platform resource recommendation service (e.g., a dynamic allocation service) in accordance with some implementations of the present disclosure. The example system 100 of FIG. 1 can be implemented in a computing device such as a laptop or desktop personal computer, a server, a mobile device such as a smart phone or tablet, a gaming console, and so on. The example system 100 includes two GPUs 104, 134, although it will be appreciated by those of skill in the art that other systems can include more GPUs, or can use other types of accelerated processing devices, without departing from the spirit of the present disclosure.

In the example of FIG. 1, the example system 100 includes an APU 102 that integrates a CPU 106 and a GPU 104 (referred to herein as an "integrated GPU). The CPU 106 and the integrated GPU 104 can be implemented on the same chip and thus can share a number of components and interfaces such as system memory 160, memory controllers 114 and direct memory addressing (DMA) engines 118 for accessing system memory 160, bus interfaces such as a personal computing interface express (PCIe) interface 116, and other interfaces and adapters not depicted in FIG. 1 such as a network interface, universal serial bus (USB) interface, persistent storage interface such as hard disk drive (HDD) and solid state drive (SSD) interface, and so on. The CPU 106 includes one or more cores 108 (i.e., execution engines), cache structures (not shown), pipeline components (also not shown), and so on. The CPU 106 and other shared components are connected to the GPU 104 via a high-speed on-chip communications fabric (not shown).

In the example system 100 of FIG. 1, the integrated GPU 104 includes a GPU compute engine 110 that includes multiple single instruction multiple data (SIMD) processing cores 112 having many parallel processing units (not shown). The GPU compute engine 110 also includes other components not depicted in FIG. 1 such as geometry processors, rasterizers, graphic command processors, hardware schedulers, asynchronous compute engines, caches, data shares, and so on. In the example of FIG. 1, the integrated GPU 104 also includes hardware accelerators in the form of application specific integrated circuits or functional logic blocks such as a video encoder/decoder 120 (i.e., a "codec)

for accelerated video encoding and decoding, an audio codec 122 for accelerated audio encoding and decoding, a display controller 124 for accelerated display processing, and a security processor 126 for accelerated security protocol enforcement and compliance.

In the example of FIG. 1, the APU 102 communicates with a discrete GPU 134 (dGPU) over an interconnect such as a PCIe interconnect 190. The PCIe interface 116 of the APU 102 and a PCIe interface 146 of the dGPU 134 communicate over the PCIe interconnect 190. In some examples, the APU 102 and the dGPU 134 can be implemented on the same substrate (e.g., a printed circuit board). In other examples, the dGPU 134 is implemented on video or graphics card that is separate from the substrate of the APU 102.

Like the integrated GPU 104, the dGPU 134 in the example of FIG. 1 includes a GPU execution engine 140 (e.g., "GPU compute engine) that includes multiple SIMD processing cores 142 having many parallel processing units (not shown). The GPU compute engine 140 also includes other components not depicted in FIG. 1 such as geometry processors, rasterizers, graphic command processors, hardware schedulers, asynchronous compute engines, caches, data shares, and so on. In the example of FIG. 1, the dGPU 134 also includes hardware accelerators in the form of application specific integrated circuits or functional logic blocks such as a video encoder/decoder 150 (i.e., a "codec) for accelerated video encoding and decoding, an audio codec 152 for accelerated audio encoding and decoding, a display controller 154 for accelerated display processing, and a security processor 156 for accelerated security protocol enforcement and compliance. The dGPU 134 also includes memory controllers 144 and DMA engines 148 for accessing graphics memory 180 (e.g., a local memory). In some examples, the memory controllers 144 and DMA engines 148 are configured to access a shared portion of system memory 160.

In the example system 100 of FIG. 1, the system memory 160 (e.g., dynamic random access memory (DRAM)) hosts an operating system 164 that interfaces with device drivers 166 for the processor resources (i.e., the APU and discrete GPU and their constituent components) described above. The system memory 160 also hosts one or more applications 162. Pertinent to this disclosure, the one or more applications can be graphics applications, multimedia applications, video editing applications, video conferencing applications, high performance computing applications, machine learning applications, or other applications that take advantage of the parallel nature and/or graphics and video capabilities of the integrated GPU 104 and the dGPU 134. The one or more applications 162 generate workloads (e.g., graphics rendering workloads, audio/video transposing workload, media playback workload, machine learning workloads, etc.) that are allocated to the integrated GPU 104 or the discrete GPU (or a combination of both) by a call to the operating system 164. Readers of skill in the art will appreciate that the one or more applications can be variety of additional application types generating a variety of workload types, not all of which are identified here. However, the specific mention of application types and workload types within the present disclosure should not be construed as limiting application types and workload types to those that are identified here.

The system memory 160 also hosts a resource manager 170 that receives a request that includes a description of a workload from a workload initiator such as the application 162, analyzes performance capabilities and utilization metrics of a plurality of platform resources, wherein the plurality of platform resources includes one or more GPUs and one or more APUs, and dynamically provides the platform resource recommendation to the workload initiator such as, for example, the application 162 to select one or more of the plurality of platform resources to execute a workload based on the performance capabilities and utilization metrics. In some examples, the resource manager 170 is embodied in computer executable instructions that are stored on a tangible computer readable medium, and when executed by a processor, cause the system 100 to carry out the aforementioned steps, as well as other steps and operations performed by the resource manager that are described below.

The resource manager can include an API 172 that allows an application 162 to request a platform resource recommendation from the resource manager 170 prior to the application assigning the workload to a particular GPU. The workload allocation recommendation, in this context, is a recommendation as to where (i.e., on which GPU) a workload should be placed (i.e., for execution of the workload). The platform resource recommendation is based on the performance capabilities and utilization metrics of various platform resources in the system 100 and can also be based on non-discoverable performance capabilities, and performance limitations for each of the platform resource recommendation in the system 100.

In some examples, the resource manager 170 includes a policy engine 174 that interprets one or more policies 176 that are relevant to determining the optimal platform resource recommendation of the workload to the platform resources in the system 100 based on the current values of runtime performance capabilities and utilization metrics of the platform resources in the system 100. The platform resource recommendation is then returned to the application 162, which the application 162 can then use to decide where to place the workload. In various implementations, the resource manager 170 communicates with the drivers 166 to obtain values for utilization metrics or obtains values for utilization metrics by other mechanisms. In such examples, the drivers 166 can include a utilization monitor for a particular processor resource and an interface for providing utilization metric values to the resource manager.

In various implementations, the resource manager 170 can provide, in the platform resource recommendation, a recommendation for platform resources allocation. A platform resource can be device in the system 100, which is allocated to perform specific tasks. The resource manager 170 provides the platform resource recommendation to the workload initiator such as the application 162 to enable the workload initiator to select or reject one or more of the recommended platform resources (e.g., the various devices in the system 100) to perform a workload. This becomes advantageous to the workload initiator since traditionally, the platform resources would be assigned by the OS 164 without an in-depth knowledge of full capabilities of the platform resources or even the platform resources. For example, APU 102 and GPU performance capabilities or limitations (due-to licensing or design) not visible to the OS 164. Also, the application 162 and OS 164 can each lack detailed run-time platform load information to evaluate available resources, per task class domain.

Various types of applications can be workload initiators, each with a variety of types of workloads. In some examples, the request from the workload initiator describes the type of workload, workload characteristics, processing requirements, and/or the performance expectations for the workload. For example, a media player application can have a media playback workload that it intends to run on the computing system. In such an example, the description of the workload includes the source resolution, display resolution, bit rate, video codec, audio codec, and frame rate for the playback workload. As another example, a video conference application can have a transcode workload that is intends to run the computing system. In such an example, the description of the workload can include a source video codec, and target video codec, and a frame rate. The video conferencing application can also include an artificial intelligence (AI) workload that includes AI algorithms for gaze correction or removing/substituting a participant's background on screen.

In some examples, the description of the workload can be provided using a descriptive language that is parsable by the resource manager. For example, the descriptive language includes a descriptor tag for bit rate, a descriptor tag for display resolution, a descriptor tag for a video encoding protocol, and so on. In these examples, the description of the workload is a structured description of the workload. In some examples, as will be described in more detail below, the descriptive language included in the request is parsable by the policy engine 174 of the resource manager 170.

Additional details are provided below that discuss receiving a request that for a platform resource recommendation, identifying one or more platform resource candidates based on the request and performance capabilities and utilization metrics of a plurality of platform resources, and dynamically providing the identified one or more platform resource candidates to the workload initiator.

Figure 2:
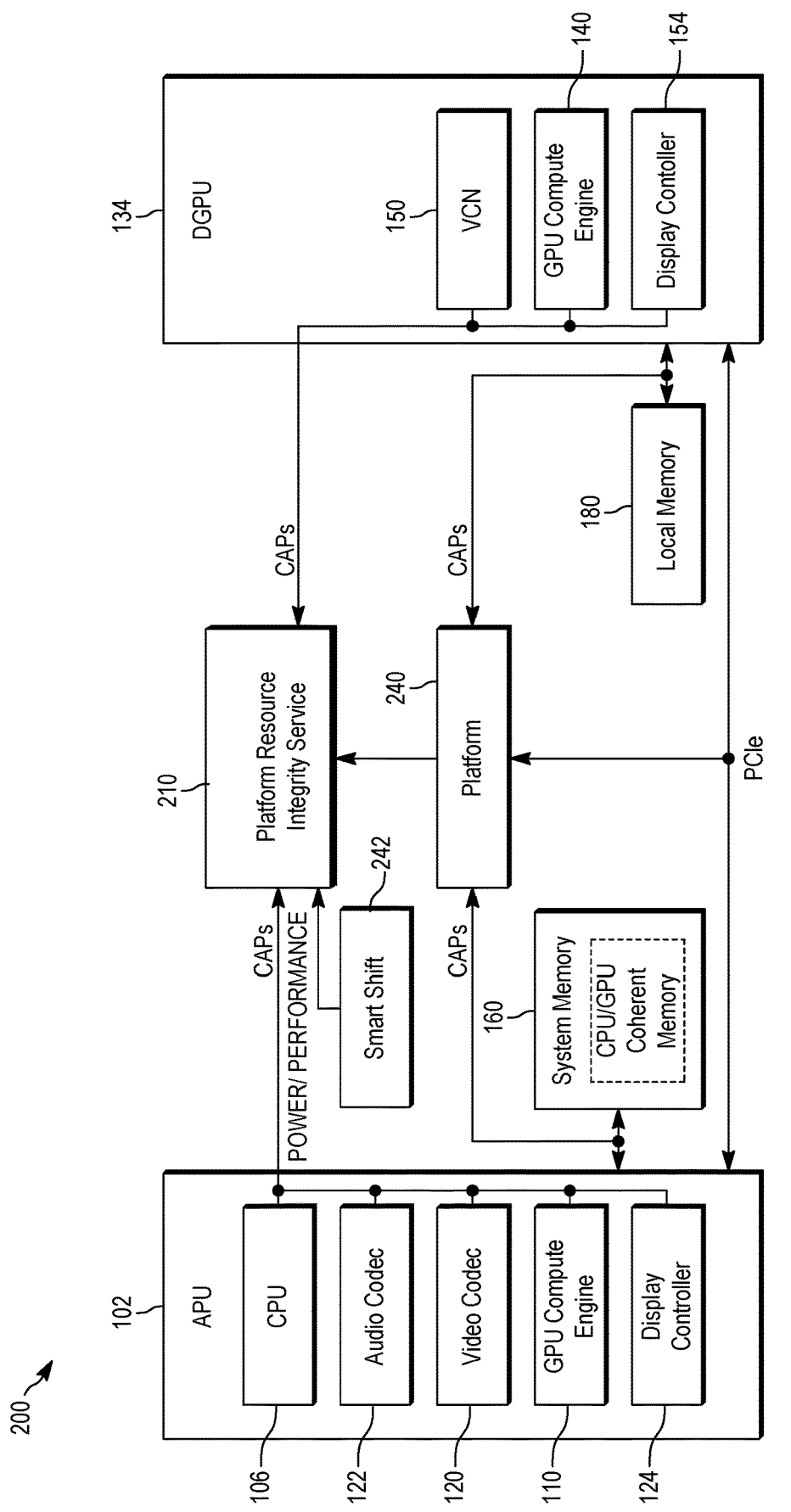
FIG. 2 sets forth an additional block diagram of an example system 200 for providing a platform resource recommendation service (e.g., a platform resource integrity service) of providing platform resource candidates in accordance with some implementations of the present disclosure.

For further explanation, FIG. 2 sets forth an additional block diagram of an example system 200 for providing a platform resource recommendation service (e.g., a platform resource integrity service) of providing platform resource candidates in accordance with some implementations of the present disclosure. In the example of FIG. 2, by way of illustration only, the example system 200 includes the APU 102 that integrates the CPU 106, the GPU 104, an audio codec 122 (e.g., an audio co-processor), the video codec 120, and the GPU compute engine 110, and the display controller 124. The dGPU 134 can include the video codec 150, the GPU compute engine 140, and the display controller 154. It should be noted that each of the components of FIG. 1 can be included in the APU 102 and the dGPU 134, but those depicted in FIG. 2 are used for illustrative convenience. The platform resource integrity service 210 (e.g., a platform resource recommendation service) is also associated with a smart shift component 242, and a platform component 240.

In one aspect, the smart shift component 242 provides information of per-engine utilization and provides additional information as requested for an application-specific integrated circuit (ASIC). The smart shift component 242 provides information pertaining to the power budget/requirements per workload and assists in shifting the power allocation between platform resources, as necessary. That is, the smart shift component 242 assists in rebalancing power distribution to the platform resources. The smart shift component 242 provides to the platform resource integrity service 210 power, performance, thermals, and policies relating to the capabilities of the platform resources such as, for example, the APU 102 and the dGPU 134.

As depicted, the APU 102 and the dGPU 134 are in communication with a platform resource integrity service 210. That is, the platform resource integrity service 210 can be referred to as a "smart allocator" (e.g., "SmartAlloc). The platform resource integrity service 210 is also associated with the system memory 160 that is associated with the APU 102. The platform resource integrity service 210 is also in association with the graphics memory 180 (e.g., a local memory) of the dGPU 134.

Again, similar to FIG. 1, the APU 102 communicates with the dGPU 134 over an interconnect such as a PCIe interconnect 190. In some examples, the APU 102 and the dGPU 134 can be implemented on the same substrate (e.g., a printed circuit board). The platform component 240 can be an interface between the APU 102 and the dGPU 134 for communicating with the platform resource integrity service 210.

The platform resource integrity service 210 is a user mode subsystem to gather, store and monitor platform capabilities to provide engine selection guidance. That is, the platform resource integrity service 210 has access to and stores all data relating to the capabilities of the APU 102, the dGPU 134, the system memory 160, and a local memory 180 (e.g., graphics memory 180 of FIG. 1). The platform resource integrity service 210 functions as a centralized platform "brain" having access to, and knowledge of, all platform resources such as, for example, the APU 102, the dGPU 134, the system memory 160, and the local memory 180 capabilities installed on a computer platform along with each of their operational modes, interconnect capabilities between the APU 102 and dGPU 134, power envelope for alternating current (AC) and direct current (DC) modes, and peripheral device capabilities that can be connected (e.g., cameras, display panels and alike but are not shown for illustrative convenience).

Additionally, the platform resource integrity service 210 has complete knowledge and awareness of even the non-discoverable capabilities (e.g., non-discoverable by an OS) or known limitations of the platform resources such as, for example, the APU 102, the dGPU 134, the system memory 160, and the local memory 180. The platform resource integrity service 210 can, using a platform component 240, receive a request from a workload initiator such as, for example, application 162 of FIG. 1, for a platform resource recommendation. Thus, the platform resource integrity service 210 can, at start up or run-time of a workload, collect information about platform's hardware resources in-use and enable the workload initiator itself, to make adjustments and use available resource. The platform resource integrity service 210 can, upon enquiry by a workload initiator, returns recommended resources hint (e.g., GPU or APU, and their engines) per use case class.

The platform resource integrity service 210 analyzes and inspects performance capabilities and utilization metrics of a plurality of platform resources such as, for example, the APU 102, the dGPU 134, the system memory 160, and the local memory 180. The platform resource integrity service 210 provides the platform resource recommendation to the workload initiator to select one or more of the plurality of platform resources such as, for example, the APU 102, the dGPU 134, the system memory 160, and the local memory 180 to execute a workload based on the performance capabilities and utilization metrics. The platform resource recommendation can also be based on the non-performance capabilities and performance limitations of the plurality of platform resources. The platform resource integrity service 210 collects, store, and monitor the performance capabilities, the utilization metrics, the non-discoverable performance capabilities, and the performance limitations for each of the plurality of platform resources in a platform resources library.

In one aspect, the platform resource integrity service 210 is a dynamic platform resources library (SmartAlloc Library) to the determine non-discoverable performance capabilities, the performance limitations, and historical performance data for each of the plurality of platform resources such as, for example, the APU 102, the dGPU 134, the system memory 160, and the graphics memory 180 based on the request from the workload initiator for the platform resource recommendation.

The platform resource integrity service 210 monitors the performance capabilities, the utilization metrics, non-discoverable performance capabilities, and performance limitations for each of the plurality of platform resources such as, for example, the APU 102, the dGPU 134, the system memory 160, and the local memory 180 during start up or runtime of the workload. The platform resource integrity service 210 can dynamically provide, during runtime of the workload, updated platform resource candidates based on adjusted performance capabilities and adjusted utilization metrics of the plurality of platform resources.

The platform resource integrity service 210 ranks each of the plurality of platform resources based on the performance capabilities, the utilization metrics, non-discoverable performance capabilities, and performance limitations. For example, the ranking can be based on policies such as, for example, a platform resource should not fall below a power threshold level in order to receive an additional workload task. Alternatively, the ranking can be based on platform capabilities in relation to the workload and user preferences.

The platform resource integrity service 210 predicts a utilization impact to execute the workload for each of the one or more of the plurality of platform resources based on the performance capabilities, the utilization metrics, non-discoverable performance capabilities, and performance limitations.

Figure 3A:
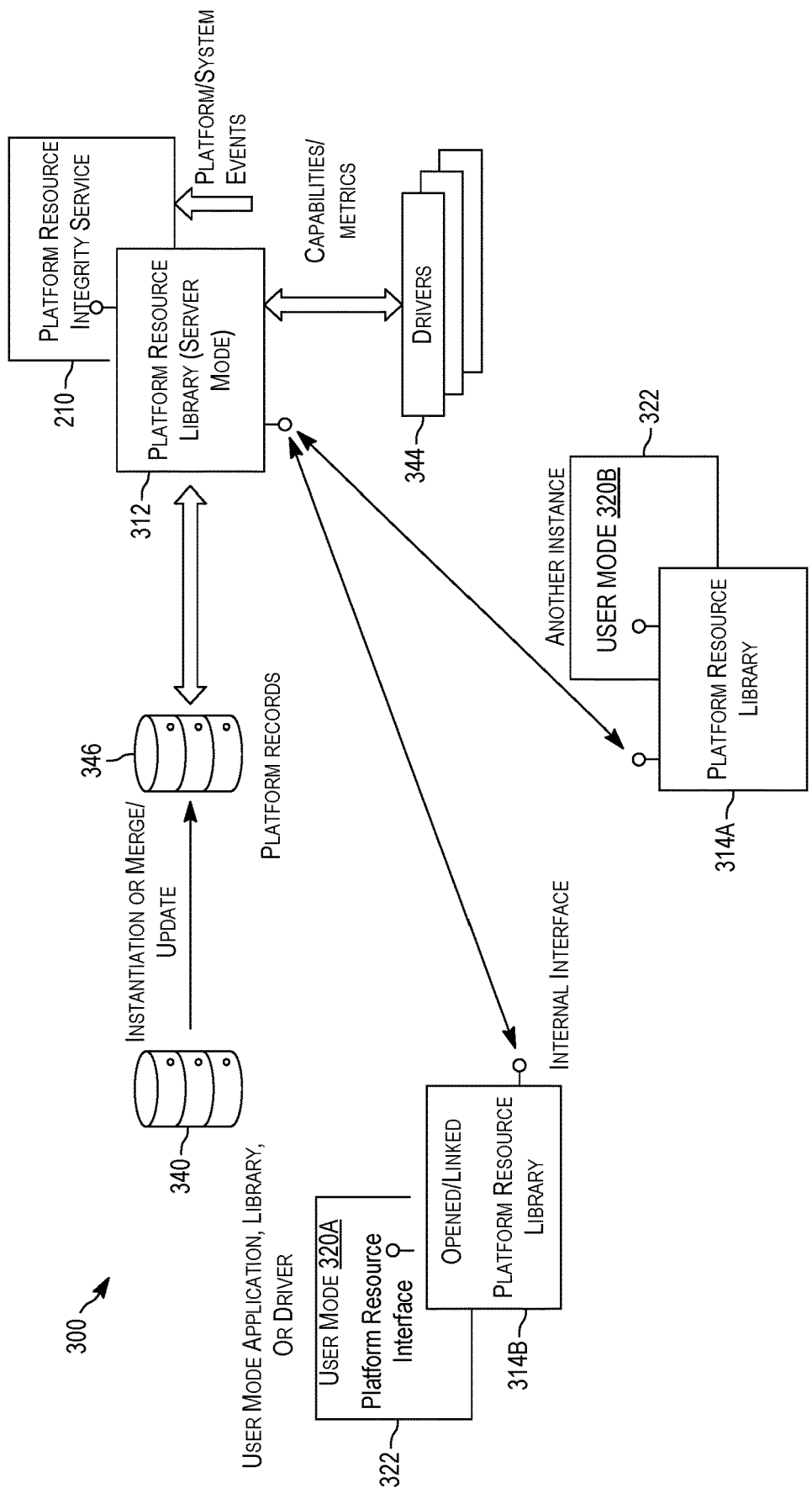
FIG. 3A sets forth an additional block diagram of an example top level system for client-server allocation (alloc) in accordance with some implementations of the present disclosure.

For further explanation, FIG. 3A sets forth an additional block diagram of an example system 300 for example top level system for client-server smart allocation (alloc) in accordance with some implementations of the present disclosure. In the example of FIG. 3A, by way of illustration only, the example system 300 includes a client-server smart alloc service, which is referred to herein as a "platform resource integrity service" 210 (e.g., a "platform resources integrity services). Thus, references to the "platform resource integrity service 210" can be used interchangeably with client-server smart allocation or a "smart allocation" service. As mentioned above, the platform resource integrity service 210 of FIG. 2 includes a platform resources library 312, which can be provided on the server side and also in a user mode such as, for example, the platform resource library 314A and 314B. Thus, the platform resource integrity service 210 can be provided collectively as a service and a library to be loaded and called on demand.

As used herein, the term "smart allocation" or "smart alloc" can refer to one or more operations or systems that provide the platform resource integrity service. Also, the term "smart allocation" or "smart alloc" can refer to an operation or system capable of identifying one or more platform resource candidates based on the request and performance capabilities and utilization metrics of a plurality of platform resources and dynamically provide the identified platform resource candidates to the workload initiator. The platform resources include one or more GPUs and one or more APUs. Also, the "smart alloc" operation or system does not "allocate" resources on behalf of a workload initiator (e.g., an application), but merely provides a recommendation or 'hint' to the workload initiator that then selects an allocation of resources.

The platform resources library 312 operates in two modes: 1) a client-only mode (or client mode/user mode) (e.g., an application or a driver) and 2) a client-server mode (or server mode). It should be noted, as used herein, reference to client-only mode (or client mode/user mode) can also be referred to as "smart alloc client mode." Similarly, reference to client-server mode (or server mode) can also be referred to as "smart alloc server mode."

Figure 3B:
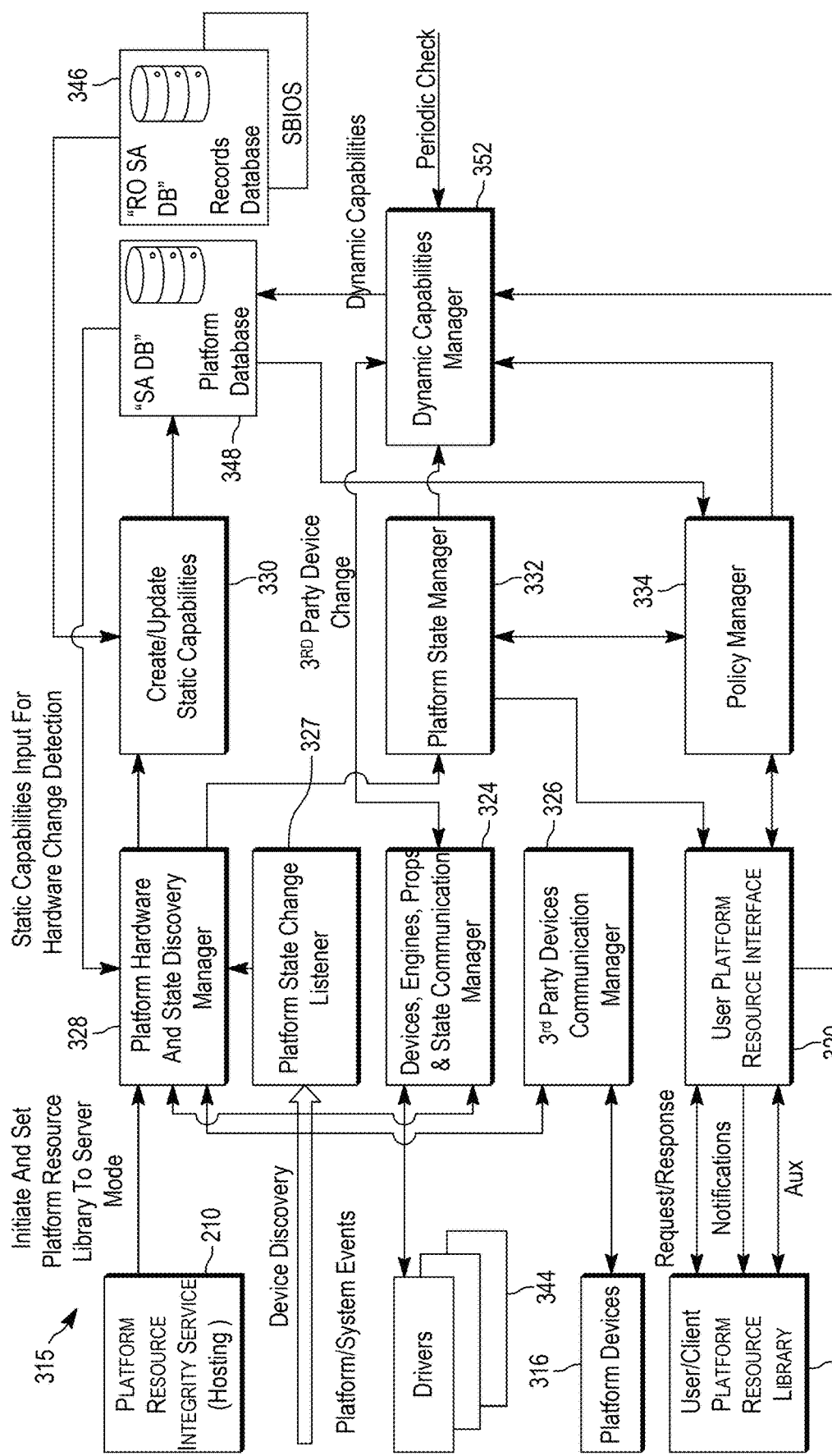
FIG. 3B sets forth an additional block diagram of an example system for providing a platform resource recommendation service as a platform resources library in server mode in accordance with some implementations of the present disclosure.
Figure 4:
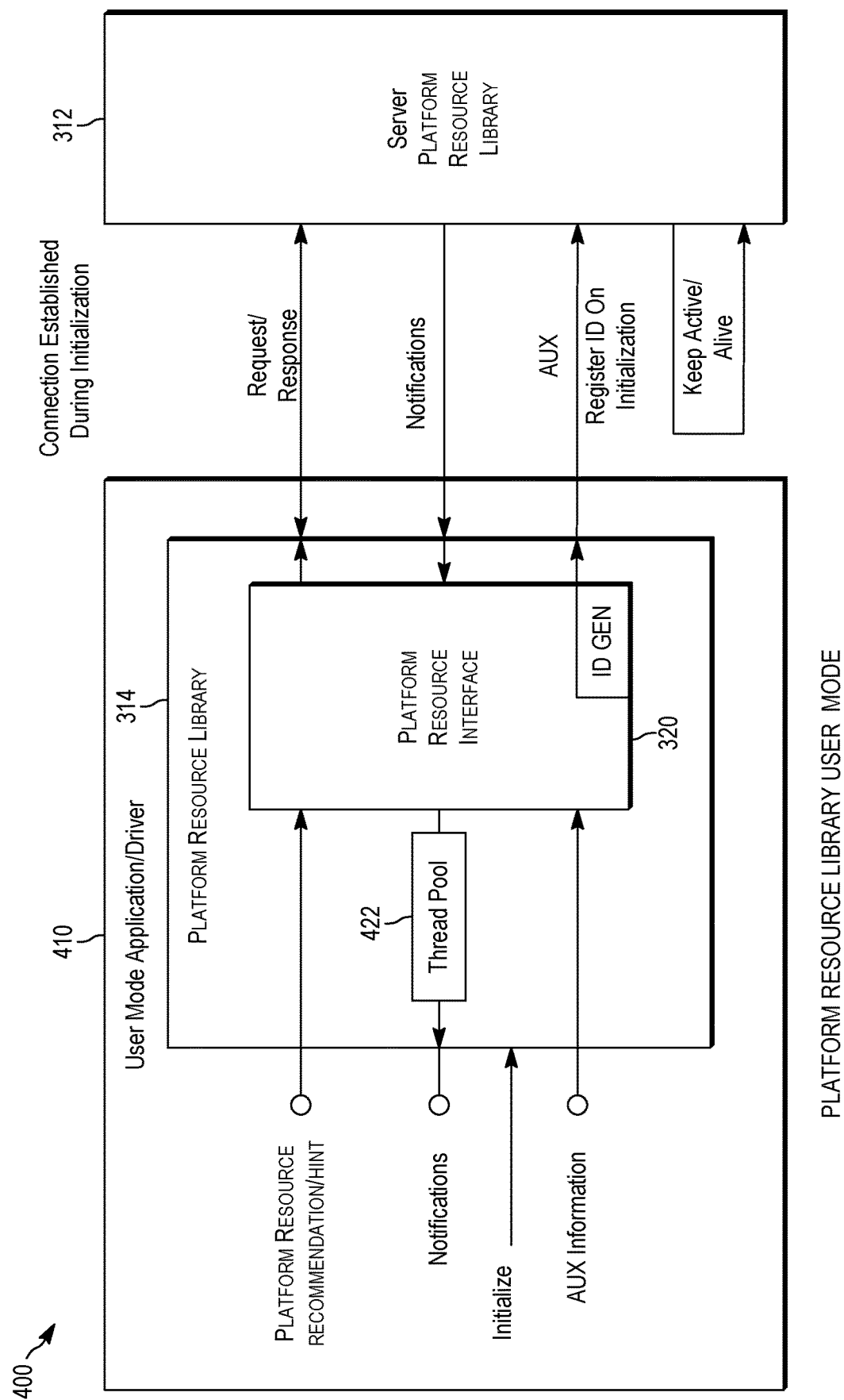
FIG. 4 sets forth a block diagram of an example system for using a platform resources library in user mode for providing a platform resource recommendation service as a in accordance with some implementations of the present disclosure.

In the client-server mode, a client can be a platform resources library that links with an application and the server performs the operations for resource estimation for the platform resource recommendation, as described in FIG. 3A, 3B and FIG. 4.

Figure 3C:
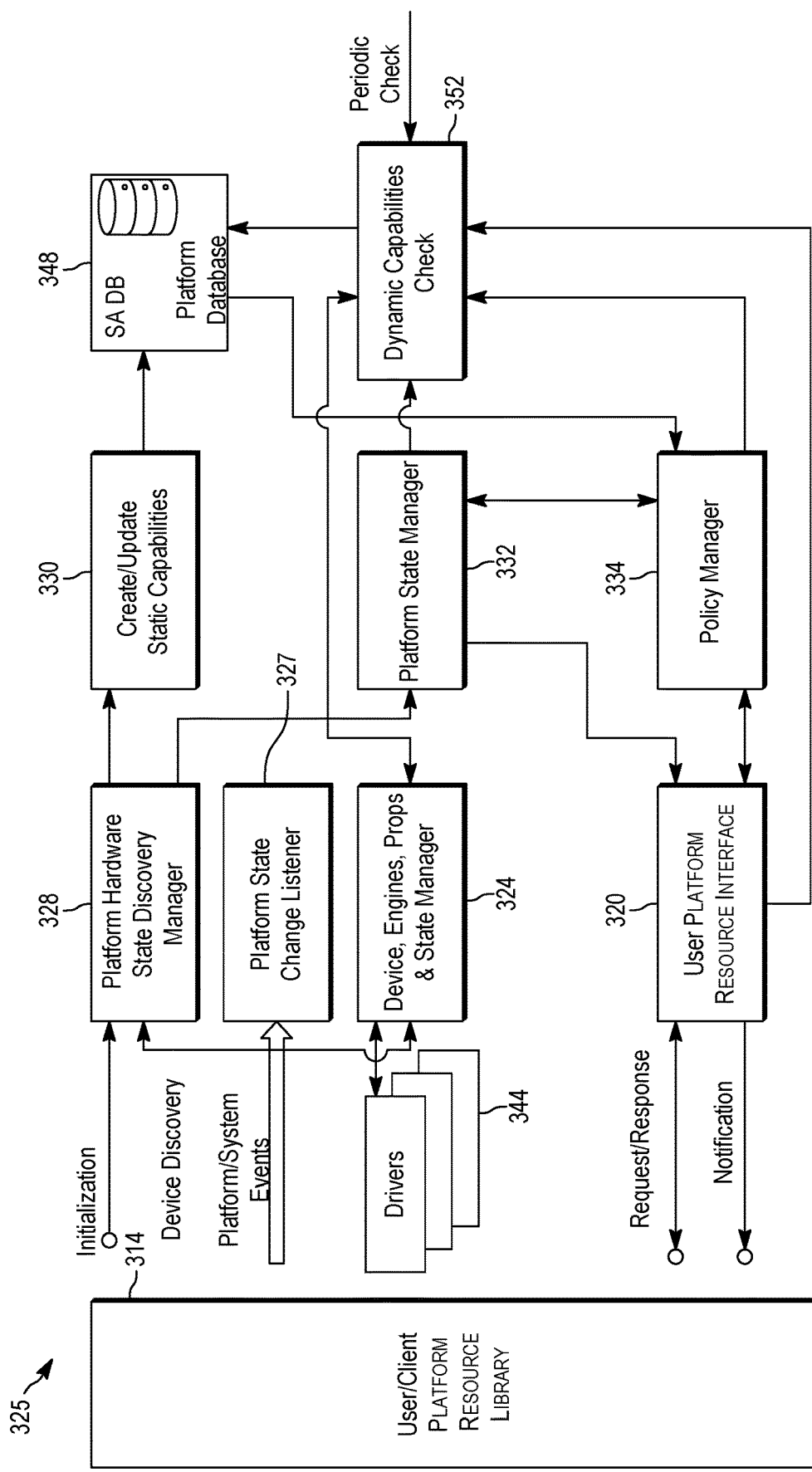
FIG. 3C sets forth an additional block diagram of the example system 325 for providing a dynamic allocation service in a client-mode using a platform resources library in accordance with some implementations of the present disclosure.

In the client-only, a client can be a platform resources library that links with an application performs the operations for resource estimation for the platform resource recommendation, as in FIG. 3C. In one aspect, a set of application that use the client-only mode can have client platform resources library code to build a serverless mesh of smart alloc enabled applications through client platform resources library communication, effectively carrying out Server centric modality.

In user mode (e.g., client mode) such as, for example, user modes 320A and 320B, the user modes 320A and 320B (and also drivers 344 in "user mode driver) can link with or load the platform resources library 314A and 314B and invokes an API (e.g., the platform resources interfaces or "internal interface) exposed by the platform resources library 314A and 314B with the platform resources library 312 (server side).

In server mode, the platform resources integrity service 210 provides the platform resources library 312, and my host the server mode and is continuously running and linked with the platform resources library 312 initialized in the server mode. Upon a request (e.g., an API call) by the user (e.g., a workload initiator), the request is passed to the server side at the platform resources library 312 using a remote procedure call (RPC) in a synchronous operation.

The platform resources library 312 can be deployed and can be accompanied by set of records such as, for example, resource platform records 340. The records 340 can be a list of platform resource capabilities including capabilities non-discoverable by an operating system, limitations, performance metrics, and historical data. The records 340 can be used by the platform resources library 312 as read-only. The records 340 can be provided in the platform resources library 312, where per original equipment manufacturer (OEM) and per platform supplementary information, along with overrides can be queried. In one aspect, the records 340 can be considered as a read-only (RO) database (DB) such as, for example, a RO SmartAlloc (SA) DB (RO SA DB). The records 340 can be encrypted and decrypted by the platform resources integrity service 210.

The records 340 are updated along with driver update installations and are used as drop-in replacement for debugging and testing purposes. Upon receiving the request from the workload initiator, the records 340 are instantiated, merged, and/or updated and provided as a comprehensive platform dataset such as, for example, a complete static, platform resources capability list, which are continuously in-use while also collecting, storing, and recording most recent activity data/metrics pertaining to the platform resources.

Upon an operating system boot, or first run of a particular application, the platform resources library 312 executes a platform resource discovery operation and determine/discover all available platform information and then cross-check the discovery data against the records 340 to build the complete static, platform resources capability list of the system 300. The static, platform resources capability list can be stored in the platform resources library 312 where the static, platform resources capability list can be accessed by subsequent queries to the platform resources library 312.

In contrast, for dynamic operations (e.g., for determining current status, load, and per GPU engine use in system 300), the platform resources library 312 collects, gather, process, store and monitor current platform resource metrics.

In an additional aspect, in user mode such as, for example, the user mode 320A or 320B, a user mode integrity process is used to connect to the platform resources library and then host a user mode platform resource library such as, for example, the platform resource libraries 314A or 314B. The platform resource library 312 instance can be linked into the platform resources integrity service 210 in the server mode at initialization time by the platform resources integrity service 210. The platform resources integrity service 210 performs the integrity tasks and serves other the platform resource libraries instances (linked with clients) upon receiving a remote procedure call (RPC) requests.

The platform resource library such as, for example, the platform resource libraries 314A or 314B can be linked with multiple client processes to serve per client platform information queries. These instances have the platform resource library such as, for example, the platform resource libraries 314A or 314B initialized in the user mode such as, for example, user mode 320A or 320B (e.g., using user mode platform resources interfaces 322A and 322B). It should be noted that only the platform resource library initialized in the server mode is the platform resource library 312 linked with the platform resources integrity service 210 and all other platform resource libraries are initiated in user mode.

To further illustrate the platform resource library 312 in the server mode, FIG. 3B sets forth an additional block diagram of the example system 315 for providing a platform resource recommendation service as a platform resources library in server mode (e.g., smart alloc server mode).

Upon startup, the platform resources integrity service 210 loads and calls the platform resource library 312 to initialize in server mode, which can use a platform hardware and state discover manager 328. Upon receiving the initial call to initiate in server mode, the platform resource library 312 subscribes for platform and system events, triggered, by an operating system (OS) or drivers, for a resource recommendation request via a platform state change listener 327 (e.g., an OS notification listener). The platform resource library 312 initiates a device discovery (e.g., discover all available hardware devices) and all other alternative devices 316 (e.g., 3rd party devices) such as, for example, discovering the drivers 344, using a device, engine, properties (prop) and state communication manager 324. The platform resource library 312 can build a list of alternative devices (e.g., $3^{rd}$ party devices) and properties (e.g., device engine, device engine properties and static capabilities "caps") such as, for example, platform resources, using an alternative devices communication manager 326.

The platform resource library 312 reads the records database 346 (e.g., a RO SA DB) or software basic input output system (SBIOS)) and applies overrides to the records, if available. The platform resource library 312 updates, in a platform database 348, if any platform capabilities changes are identified or creates additional platform capabilities if not identified via the platform hardware and state discover manager 328. The platform resource library 312 can also determine a platform state for each platform resource and sets the identified state in a platform state manager 332 using the platform hardware and state discover manager 328.

At runtime, for the platform static capabilities 330 can be created or updated and, upon a device arrival/removal detection, the platform state change listener 327, using the platform hardware and state discover manager 328, initiates the operation described herein for startup. The platform state change listener 327 can update the platform database 348 (e.g., a read/write records database) and/or sets the state in the platform state change listener 327, if required. The platform state change listener 327 can inform and provide to the user platform resources interface 322 (e.g., a user platform resource interface manager) information relating to any platform resource state change.

The user platform resources interface 322 provides to the user (via the platform resource library 314) any notifications any platform resource state changes, redirects a platform resource recommendation (e.g., a hint) to the per use case policy manager 334. If tracking is required for each platform resource library (e.g., each platform resource library per client) such as, for example, the user platform resource library 314, the platform resource library 312 (in server mode) can accept, via an auxiliary channel (AUX), registration and un-registration of each user using user identifier (ID). The user platform resources interface 322 can maintain an active user/client state or "alive state" with each registered client in the platform state manager 332. The user platform resources interface 322 can indicate to the platform state manager 332 to clean, eliminated, and/or scrub those of the user/client's having previously registered as "active state" but longer maintain an active user/client state or fail an active user state verification from the user platform resources interface 322. Additionally, the user platform resources interface 322 provides to the user a cross-process communication channel.

In an additional aspect, the policy manager 334 receives and process a platform resource recommendation request (e.g., a resource allocation hint request. In so doing, the policy manager 334 determines a use case class request and determines the details of request such as, for example, whether there is a specific engine or format requirement as part of the request) from a request record in the platform database 348. The policy manager 334 retrieves, from the platform database 348, the static capability records and the platform resources state, and applies a per use case hint request to decide one or more platform resources to recommend per the request. In one aspect, the platform database 348 can have a policy override (as part of records merging from the records database 346) in case of platform deficiency or other reasons.

At runtime, for the platform dynamic capabilities of the platform resources, where the dynamic capabilities are an extension of the static capabilities, the dynamic capabilities manager 352 can be initiated. Upon a workload initiator initiating the platform resource recommendation request, the policy manager 334 determines and check the dynamic records in the platform database 348 to make a resource allocation decision, similar to the process described above for the static capabilities records.

In one aspect, the dynamic capabilities manager 352 obtains a device's engine load and alternative device load (when applicable) via the 3rd party devices communication manager 326 and store the information in dynamic capability records of the platform database 348. The 3rd party devices communication manager 326 checks and determine power management states and consumption for each of the alternative devices (e.g., the drivers 344) upon receiving a request from the dynamic capabilities manager 352.

The dynamic capabilities manager 352 triggers a check of load on of the platform resources following one or more event such as, for example, a platform state change, a user platform resource recommendation/hint request (if response time is not compromised), or a periodic check request. The dynamic capabilities manager 352 can build and maintain a historical profile of platform device engine(s) use and stores the historical profile in dynamic capability records of the platform database 348.

In an additional aspect, if user/client tracking is required and each user/client platform resource recommendation/hint request needs to be stored and logged, the user platform resource interface 320 can notify the dynamic capabilities manager 352 of such requirements. The client (via the platform resource library 314) is identified by a client ID, generated by the platform resource library 314, which is supplied by the user platform resource interface 320. Also, the user platform resource interface 320 notifies the dynamic capabilities manager 352 if a client has terminated connection and provides the terminated clients user ID to free up any reserved resource.

For an event subscription, the platform state change listener 327, which can reside in the platform resource library 312, is active in the server mode. The platform state change listener 327 monitors and listens for a variety of events and provide/include a list of system or driver events. The list of events can increase and grow over time. In one aspect, the platform state change listener 327 monitors and listens for a variety of essential events that must always registered with the platform resource library 312 such as, for example, an AC/DC switch event, an addition or removal of a platform resource, or a change to a power envelope based on a user request via a power source (e.g., a battery/performance slider) or a change to control panel settings such as, for example, changes to AC and DC modes. In one aspect, there can be multiple events that occur at the same time. The platform resource library 312 will queue each of the events up and process in the order they occur. It should be noted that an operating system sets a devices (e.g., a non-primary display GPU) into hot or cold state such as, for example, a D3 Hot or D3 cold state. Any access to such devices will wake device up. Thus, the platform resource library 312 subscribes and avoid access to devices in any non D0 states (e.g., D1, D2, and D3 power states). Rather, the platform resource library 312 stores and cache all platform resource capabilities and consider all platform resources as available when providing the platform resource recommendation to the workload initiator.

To further illustrate the platform resource library 312, FIG. 3C sets forth an additional block diagram of the example system 325 for providing a smart allocation service in a client-mode using a platform resources library. That is, FIG. 3C depicts a client-only mode variant when a platform resources library itself provides resource estimation without server part (or without the smart allocation server mode). As used herein, the smart allocation service in a client-mode using a platform resources library can be referred to as a platform resource recommendation service as a platform resources library in client mode (e.g., user mode) without smart allocation server mode.

Again, as previously mentioned, FIG. 3C depicts operations in the client-only mode where a client can be a platform resources library that links with an application performs the operations for resource estimation for the platform resource recommendation. Additionally, a set of workload initiators (e.g., applications) that use the client-only mode can have client platform resources library code to build a serverless mesh of smart alloc enabled applications through client platform resources library communication, effectively carrying out the client-server modality.

The system 325 provides an example implementation of essential components of the platform resources integrity service 210 and the platform resources library 314 in user mode (e.g., smart alloc client mode) while using similar components as described herein. In this way, example system 325 can be adjusted to accommodate future expansion of and implantation of the platform resources integrity service 210 to a complete client-server architecture or other type of computing system.

In one implementation, a client application (e.g., a user mode application) or a user mode driver loads or links with and initialize platform resources library 314 in the user mode issuing a request for a platform resource recommendation. It should be noted that as depicted in FIG. 3C, the platform resources library 314 is initialized in client mode rather than in the server mode, as described in FIG. 3B.

The platform resources library 314 initialization and implantation can include initializing and implementing the following activities. In one aspect, the platform resources library 314 initialization and implantation can include providing an interface definition through the user platform resource interfaces 320 for providing and implementing various notifications. A platform state change listener 327 subscribes to one or more platform system events such as, for example, AC/DC power events. All platform capabilities can be reduced to only interface supported domain. Also, the static capabilities of the platform resources can be considered to be unchanged and only discovered once using the platform database 348. The dynamic capabilities of the of the platform resources can enquire via the dynamic capabilities manager 352 at the time of platform resource recommendation request. Also, the platform resources library 314 initialization and implantation can include becoming aware and avoid unnecessary wake up of D3 state devices, as described herein. All historical data of the dynamic capabilities stored in the dynamic capabilities manager 352 can be used to determine a necessary load history for determining the platform capabilities of the various platform resources.

The platform resources library 314 provides a client application with entry points through which the client application (e.g., a workload initiator) can enquire about recommended platform resources or hints.

In one aspect, a client subscribes with the platform resources library 314 to receive notifications for one or more types of notifications. Upon subscribing, the platform resources library 314 provides the client any notifications about various platform resource state changes via the platform state manager 332 such as, for example, AC/DC switch or device arrival/removal. For some events, a previously issued platform resource recommendation/hint can be invalidated. In this case, the platform resources library 314 can dynamically provide an updated platform resource recommendation or allocation hint. However, the decision to re-allocate platform resources or maintaining use of previously allocated platform resources can be at the client discretion. That is, the platform resources library 314 only provides the platform resource recommendation or allocation hint but does not make the decision to reallocate or continue using the previously allocated platform resources.

In one aspect, the platform resource recommendation can be provided per use case class. A list of the platform resources per class can be provided and used in conjunction with the user platform resource interface 320. The user platform resource interface 320 provides via the platform resources library 314, hierarchical use case classes along with the details and resources associated with each of the hierarchical use case classes. All available use case domain classes and a platform resource list per class can be provided in conjunction with the user platform resource interface 320.

In an additional aspect, the platform resources library 314 provides to a user/client a platform resource recommendation via the user platform resource interface 320. The platform resource recommendation includes the platform resource class, details, and performance capabilities and utilization metrics.

The resource enquiry received by the platform resources library 314 specifies a use case class (e.g., the domain) of a platform resource (e.g., video or audio) and the specific details about platform resource recommendation request such as, for example, a type of the encoding standard for a video class. Use case class and the specific details of the use case can be used as the input to the platform resources library 314 to provide the platform resource recommendation of the best or "optimal" platform resource to use. The platform resource recommendation can be specific such as, for example, providing a recommended CPU or GPU shaders and can even provide the dedicated hardware. Thus, the platform resources library 314 provides a user (e.g., a workload initiator) a platform resource recommendation that includes specific devices and a resource description that can be appropriate for the purpose and details of the request.

In an additional aspect, the platform resources library 314 can optionally provide a performance profile such as, for example, a performance preference per class (domain) for quality (e.g., more power) as compared to efficiency such as, for example, power saving (e.g., less power). This option enables the client to receive in the platform resource recommendation the option to select a particular recommended solution for execution in case of multiple variants of implementations of the same feature. In one aspect, the performance profile includes performance capabilities and limitations of a particular platform resource. The performance profile data can be collected, monitored, and stored in the platform database.

For further explanation, FIG. 4 sets forth an additional block diagram of an example system 400 for using a platform resources library in user mode for providing a platform resource recommendation service as a in accordance with some implementations of the present disclosure. More specifically, FIG. 4 depicts a logical diagram of a client or "client mode" for the client-server smart alloc system, complimentary to FIG. 3B (where the server mode is depicted) and discussed in FIG. 3A. In the example of FIG. 4, by way of illustration only, the example system 400 includes a user mode application/driver 410 in communication with the platform resources library 312, which can be provided on the server side. The user mode application/driver 410 includes the platform resource library 314 internally or externally. Thus, the platform resource integrity service 210 of FIG. 2 can be provided collectively as platform resource integrity service and a platform resource library such as, for the platform resources library 312 in the server mode and the platform resources library 314 in user mode to be loaded and called on demand or as need.

In one implementation, during initialization for providing a platform resource recommendation service, client application such as, for example, the user mode application/driver 410 loads or link with and initialize the platform resources library 314 in the user mode. In one aspect, the platform resources library 314 can be initialized in client mode while the server platform resource library 312 is initialized in the server mode. Once initialized, the platform resources library 314, in user mode, establishes communication with the platform resources library 312 in server mode. If, however, the connection with the platform resources library 312 and the platform resources library 314 cannot be established, an error shall be returned to the user mode application/driver 410.

Upon initialization, the platform resources library 312 attempts to establish cross-process communication channels with the server platform resources library 312. The platform resource interface 320 provides the cross-process communication channels. Once initialized, the platform resources library 314 communicates with the platform resources library 314 on behalf of the user mode application/driver 410 to: a) provide or receive a request/response for a platform resource recommendation (e.g., a per use case platform resource hint recommendation), b) receive notifications on any platform state changes; and c) optionally providing information, metrics, and capabilities pertaining to platform resource usage.

For example, the user mode application/driver 410 calls the platform resources library 314 using the platform resource interface 320 to request a platform resource recommendation such as, for example, a request or enquire about per domain use case resource allocation recommendation. The platform resources library 312 provides to the platform resources library 314 the platform resource recommendation. However, if the platform resource recommendation service notifications suggest to re-allocate a platform resource due to a platform state change, it is the user mode application/driver 410 responsibility to re-allocate the platform resource. A thread pool 422 can be used by the platform resources library 314 to provide notifications to the user mode application/driver 410. Also, callbacks can be implemented on the platform resources library 314 in unblocking form using the thread pool 422, such that there would be no blocking of calls of the platform resource interface 320 from within the callback itself so the user mode application/driver 410 can complete full a re-initialization and call other interface functions of the platform resources library 314.

Again, as mentioned here, various connections and interfaces can be established between the platform resource interface 320 and the server platform resource library 312 such as, for example, a request/response, notifications, an auxiliary (AUX), and state change interface connection.

In one aspect, the platform resource interface 320 enables the user mode application/driver 410 to issue a request and receive a response (e.g., the request/response) for the platform resource recommendation. In one aspect, the platform resource recommendation includes platform resource capabilities, limitations, utilization metrics, and a type of platform resource for a specific requirement. Also, the platform resource interface 320 enables the user mode application/driver 410 to subscribe to the various notifications such as, for example, any platform state changes. A platform state change can also be included or provided with an updated platform resource recommendation for a resource allocation or re-allocation event.

The AUX information channel can be created by the platform resources library 314 to implicitly maintain and "keep active" (or "keep alive") a registration with the server platform resources library 312 such as, for example, if per-client tracking is required.

A user identified (ID) can be provided and generated (ID GEN) by the platform resources library 314, which can be used for tracking the user mode application/driver 410. The platform resources library 314 unloads the aux channel but can be unregistered by the server platform resources library 312. Also, the AUX information channel can be used for (without involvement from the user mode application/driver 410) maintaining/keeping messages active/alive, and in case of server mode shutdown attempt to reconnect to the server platform resources library 312. The AUX information channel can be used for providing notifications about connection loss and connection recovery shall be sent to platform resource interface 320. The AUX information channel can be used to register and unregister the platform resources library 314 on load/unload, with the provided user ID. The user ID can be used by the server platform resources library 312 to track a state of the user mode application/driver 410 (e.g., client state) and clean up resources in the event a connection is terminated with the user mode application/driver 410.

Additionally, the server platform resources library 312 collects, gathers, monitors, and discovers all capabilities and limitations of platform level resources (e.g., static capabilities) and monitors and maintains run-time use of the platform resources per capability (e.g., dynamic capabilities) via metrics. The server platform resources library 312 provides the platform resource recommendation of desired or "preferable" platform resources per domain class (e.g., device/engine per domain class such as, for example, video, audio, three-dimensional (3D), and/or compute class. A per class policy can also be defined and used. A policy can be a rule and can be altered or adjusted over the time. The policy rules can be expandable for new domains classes, user tasks and workloads.

Figure 5A:
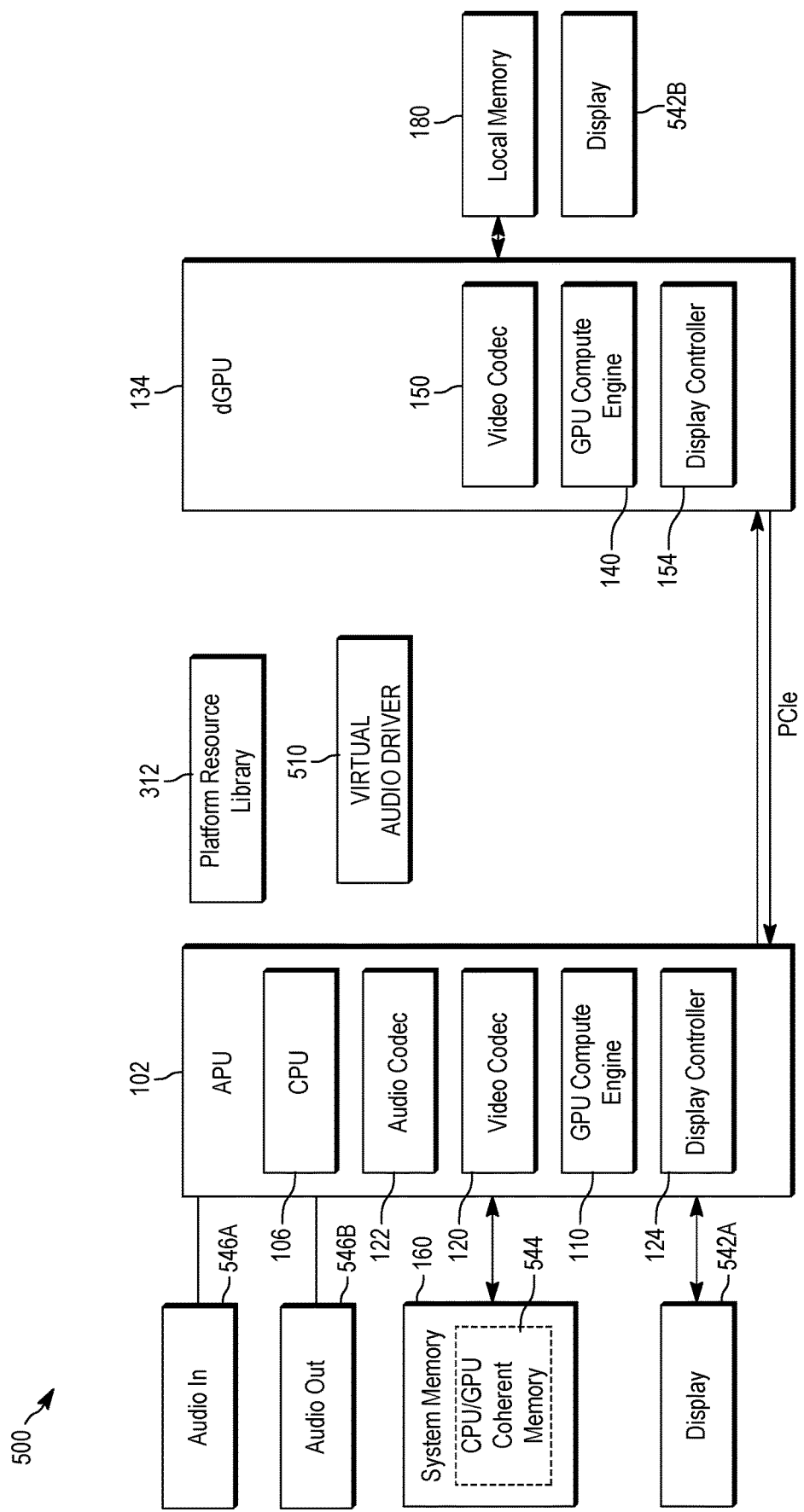
FIG. 5A sets forth an additional block diagram of an example system for providing a platform resource recommendation service (e.g., a platform resource integrity service) for providing platform resource candidates for audio noise reduction (ANR) in accordance with some implementations of the present disclosure.

For further explanation, FIG. 5A sets forth an additional block diagram of an example system 500 for providing a platform resource recommendation service (e.g., a platform resource integrity service) of providing platform resource candidates for audio noise reduction (ANR) in accordance with some implementations of the present disclosure. The example system 500 includes the APU 102 that integrates the CPU 106, the GPU 104, the audio codec 122, the video codec 120, and the GPU compute engine 110, and the display controller 124. The example system 500 includes the dGPU 134 that includes the video codec 150, the GPU compute engine 140, and the display controller 154. The APU 102 can be in communication with the system memory 160 having a GPU/CPU coherent memory 544 and a display 542. The dGPU 134 can be in communication with the local memory 180 and a display 542B. It should be noted that each of the components of FIG. 1 or 2 can be included in the APU 102 and the dGPU 134, but those depicted in FIG. 5A are used only for illustrative convenience. The APU 102 receives audio in 546A data and output audio data as audio out 546B.

The example system 500 includes the platform resource library 312 that is in communication with the APU 102 and the dGPU 134. The platform resource library 312 can be responsible for collecting, gathering, and storing static and dynamic capabilities of each platform resource such as, for example, the APU 102 and the dGPU 134.

In operation, a workload initiator such as, for example, a virtual audio driver 510 can request a platform resource recommendation hint such as, for example, inquiring in the request information about allocation recommendation for audio noise reduction (ANR). The platform resource library 312 analyzes and determine the static capabilities (e.g., resource availability) and dynamic capabilities (resource occupancy) of all platform resources such as, for example, the APU 102, the dGPU 134 and their internal/associated components (e.g., compute engine 110, display controller 124, etc.).

The platform resource library 312 provides a platform resource recommendation based on the specific details on the request issued from the driver 510 such as, for example recommending what resource to use per quality request for maximizing efficiency and optimization of a power/performance ratio. Using the platform resource recommendation received from the platform resource library 312, the workload initiator (e.g., the driver 510) can accept or reject the platform resource recommendation. For example, if the workload initiator (e.g., the driver 510) accepts the platform resource recommendation, the workload initiator (e.g., the driver 510) allocates a recommended platform resource to maximize efficiency and optimization of a power/performance ratio.

Figure 5B:
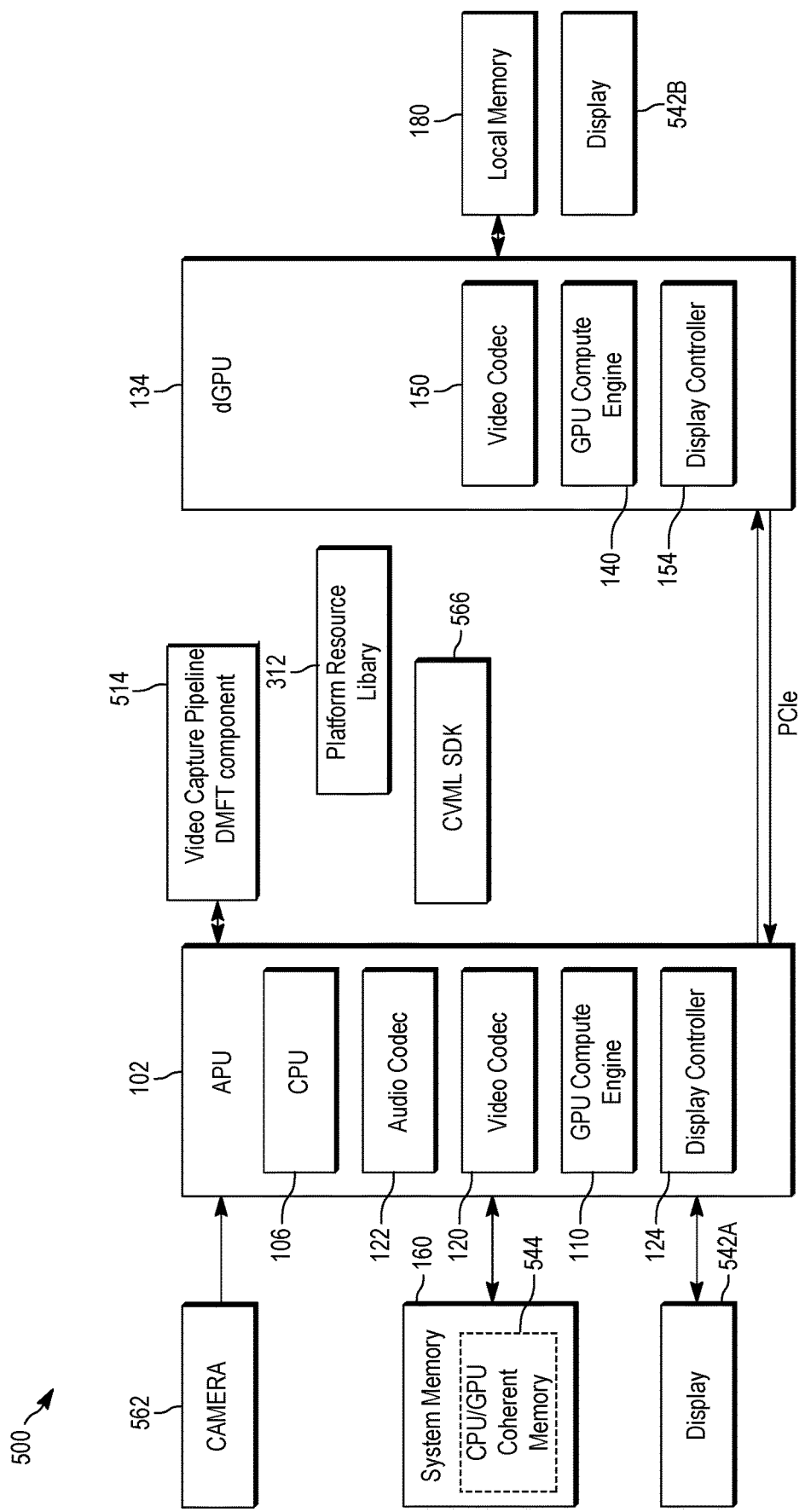
FIG. 5B sets forth an additional block diagram of an example system for providing a platform resource recommendation service (e.g., a platform resource integrity service) for providing platform resource candidates for video pre-processing in accordance with some implementations of the present disclosure.

FIG. 5B sets forth an additional block diagram of an example system 500 for providing a platform resource recommendation service (e.g., a platform resource integrity service) of providing platform resource candidates for video pre-processing in accordance with some implementations of the present disclosure.

In operation, a workload initiator such as, for example video capture pipeline device media foundation transform (DMFT) component 514, which can be connected to camera 562, requests a platform resource recommendation hint such as, for example, inquiring in the request information about allocation recommendation for video pre-processing. The platform resource library 312 analyzes and determine the static capabilities (e.g., resource availability) and dynamic capabilities (resource occupancy) of all platform resources such as, for example, the APU 102, the dGPU 134 and their internal/associated components (e.g., compute engine 110, display controller 124, etc.).

The workload initiator such as, for example, a video capture pipeline device DMFT component 514 links with a computer vision and machine learning (CVML) software development kit (SDK) 566 for vide quality improvement such as, for example, denoising, brightness level, contrast, and other image enhancements. The CVML SDK 566 loads the platform resource library 312. The platform resource library 312 analyzes and determine the static capabilities (e.g., resource availability) and dynamic capabilities (resource occupancy) of all platform resources such as, for example, the APU 102, the dGPU 134 and their internal/associated components (e.g., compute engine 110, display controller 124, etc.).

The platform resource library 312 provides a platform resource recommendation based on the specific details on the request issued from the workload initiator (e.g., the video capture pipeline DMFT component 514) such as, for example recommending what resource to use per quality request for maximizing efficiency and optimization of a power/performance ratio. Using the platform resource recommendation received from the platform resource library 312, the workload initiator (e.g., the video capture pipeline DMFT component 514) can accept or reject the platform resource recommendation. For example, if the workload initiator (e.g., the video capture pipeline DMFT component 514) accepts the platform resource recommendation, the workload initiator (e.g., the video capture pipeline DMFT component 514) allocates a recommended platform resource to maximize efficiency and optimization of a power/performance ratio.

Figure 5C:
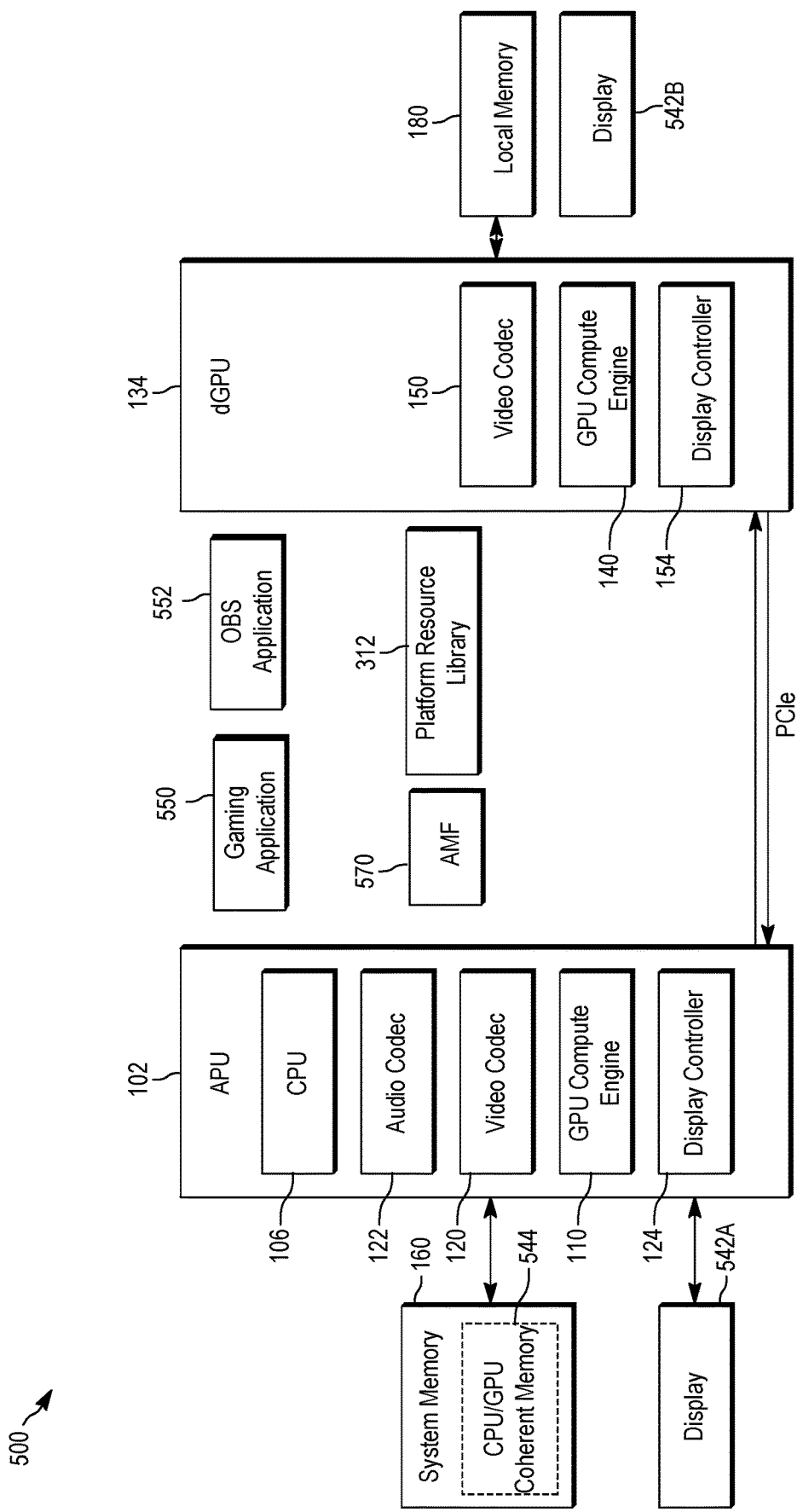
FIG. 5C sets forth an additional block diagram of an example system for providing a platform resource recommendation service (e.g., a platform resource integrity service) for providing platform resource candidates for video recording/streaming in accordance with some implementations of the present disclosure.

FIG. 5C sets forth an additional block diagram of an example system 500 for providing a platform resource recommendation service (e.g., a platform resource integrity service) of providing platform resource candidates for video recording/streaming in accordance with some implementations of the present disclosure.

In operation, a workload initiator such as, for example a gaming/gameplay application 550 to capture, stream, and sharing media/videos and images and the open broadcaster software (OBS) application 552 requests a platform resource recommendation hint such as, for example, inquiring in the request information about allocation recommendation for video pre-processing.

The gaming/gameplay application 550 and the OBS application 552 can open an advanced media framework (AMF) 570 for encoding such as, for example, encoding the request. The AMF 570 can open the platform resource library 312. The platform resource library 312 analyzes and determine the static capabilities (e.g., resource availability) and dynamic capabilities (resource occupancy) of all platform resources such as, for example, the APU 102, the dGPU 134 and their internal/associated components (e.g., compute engine 110, display controller 124, and the video codec 120 and 150, etc.).

The platform resource library 312 provides a platform resource recommendation based on the specific details on the request issued from the workload initiator (e.g., the gaming/gameplay application 550 and the OBS application 552) such as, for example recommending what resource to use per quality request for maximizing efficiency and optimization of a power/performance ratio. Using the platform resource recommendation received from the platform resource library 312, the workload initiator (e.g., the gaming/gameplay application 550 and the OBS application 552) accepts or rejects the platform resource recommendation. For example, if the workload initiator (e.g., the gaming/gameplay application 550 and the OBS application 552) accepts the platform resource recommendation, the workload initiator (e.g., the gaming/gameplay application 550 and the OBS application 552) allocates a recommended platform resource to maximize efficiency and optimization of a power/performance ratio.

Figure 5D:
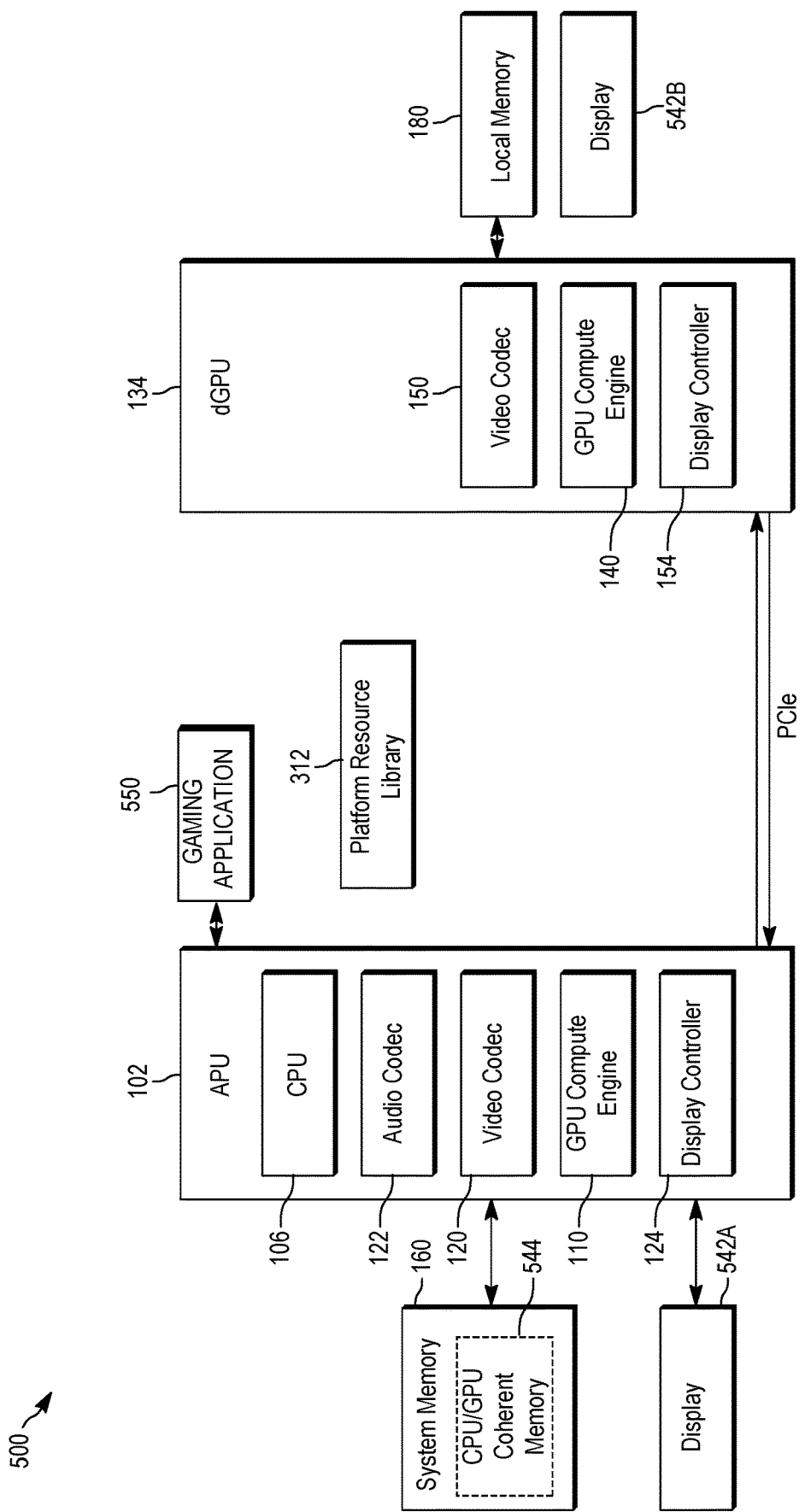
FIG. 5D sets forth an additional block diagram of an example system for providing a platform resource recommendation service (e.g., a platform resource integrity service) for providing platform resource candidates for post processing and scale accordance with some implementations of the present disclosure.

FIG. 5D sets forth an additional block diagram of an example system 500 for providing a platform resource recommendation service (e.g., a platform resource integrity service) of providing platform resource candidates for post processing and scale accordance with some implementations of the present disclosure.

In operation, the workload initiator such as, for example the gaming/gameplay application 550 to capture, stream, and sharing media/videos and images requests a platform resource recommendation hint such as, for example, inquiring in the request information about allocation recommendation for video pre-processing.

The workload initiator such as, for example a gaming/gameplay application 550 can open the platform resource library 312. The platform resource library 312 analyzes and determine the static capabilities (e.g., resource availability) and dynamic capabilities (resource occupancy) of all platform resources such as, for example, the APU 102, the dGPU 134 and their internal/associated components (e.g., compute engine 110, display controller 124, and the video codec 120 and 150, etc.).

The platform resource library 312 provides a platform resource recommendation based on the specific details on the request issued from the workload initiator such as, for example recommending what resource to use for upscaling and post processing. Using the platform resource recommendation received from the platform resource library 312, the workload initiator accepts or rejects the platform resource recommendation.

It should be noted that, as depicted in FIG. 5D, a gaming application can use the dGPU 134 or the APU 102 for rendering. Thus, FIG. 5D represents post-processing of a rendered frame on either the dGPU 134 or the APU 102 without application awareness of further upscale/post-processing. However, FIG. 5D can also apply when the gaming application also queries about platform resources and requests post-processing actions.

Figure 6:
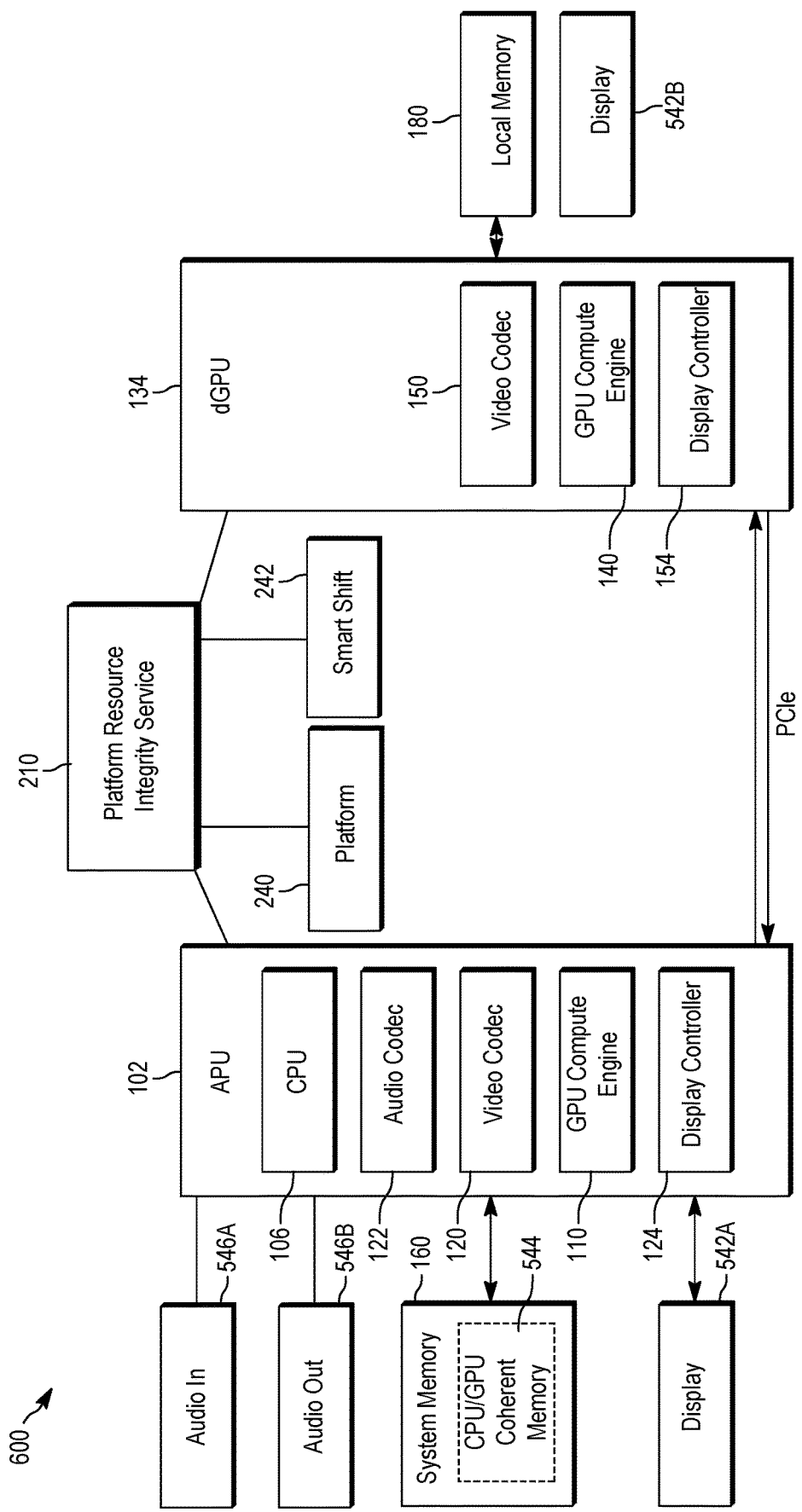
FIG. 6 sets forth an additional block diagram of an example system for providing a platform resource recommendation service (e.g., a platform resource integrity service) for compound processing of an upscaling operation accordance with some implementations of the present disclosure.

Turning now to FIG. 6, a block diagram is depicted of an example system 600 for providing a platform resource recommendation service (e.g., a platform resource integrity service) for compound processing of an upscaling operation accordance with some implementations of the present disclosure. Also, FIG. 6 is a generalized operation for compound processing, which can be applied for upscaling process. That is, FIG. 6 can apply to compound processing of an upscaling operation using a platform resource recommendation service in accordance with some implementations of the present disclosure.

In operation, the platform resource integrity service 210 can also provide an upscaling service (e.g., "smart upscaling" service). That is, the upscaling service selects optimal resource access to perform upscaling. More specifically, the upscaling service provided by the platform resource integrity service 210 correctly identifies the presence or availability of the APU 102 and the dGPU 134 and spreads rasterization and upscaling workloads across or between the APU 102 and the dGPU 134. In an additional aspect, the platform resource integrity service 210 assigns the APU 102, the dGPU 134, or a combination thereof for rendering, upscaling, and scan out arrangements of an image.

In an additional aspect, the upscaling service, provided by the platform resource integrity service 210, dynamically identifies one or more GPUs and one or more APU's to upscale data. The upscaling service provided by the platform resource integrity service 210 dynamically assigns workloads of the upscaling operation to the APU 102, the dGPU 134, or a combination thereof based on at least a modality of the upscaling operation. In one aspect, the modality of the upscaling operation includes, but is not limited to, nearest-neighbor interpolation, bilinear (basic interpolation), and bicubic algorithms (complex interpolation). Each of the modalities constitutes a different upscaling operation, and each one processes a similar image differently. The workloads of the upscaling operation can be processed by the APU 102, the dGPU 134, or a combination thereof based on dynamic assignment of the workloads. The upscaling service, provided by the platform resource integrity service 210, dynamically assigns the workloads of the upscaling operation based on user preferences, platform capabilities of the APU 102, the dGPU 134, or a combination thereof.

In an additional aspect, the upscaling service, provided by the platform resource integrity service 210, dynamically selects the modality of the upscaling operation by the user preferences, platform capabilities of the APU 102, the dGPU 134, or a combination thereof.

For example, assume that the upscaling service attempts to preserve or save processing cycles of the dGPU 134 in order to do complete full frame rendering with ray tracing. In order to do this, the dGPU 134 renders at a lower spatial unit. Using the upscaling service, the platform resource integrity service 210 assigns, to the APU 102, the APU 102 restores the lower resolution rendering back to high-resolution using filtering such as, for example, edge enhancement. Thus, the upscaling service, provided by the platform resource integrity service 210, provides flexibility for upscaling by selecting the appropriate upscaling algorithm based on user preferences and platform capabilities.

In one aspect, the user preferences includes, but not limited to, defining upscaling modalities (e.g., the mode or type of upscaling operation), values, thresholds, capacities, utilization metrics. The user preferences includes the various types of headroom bias, power bias, quality bias, and speed bias. For example, user preferences by include 1) using a highest quality of upscaler modality that limits the APU 102 to less than a defined utilization threshold (e.g., less than 60 percent) for headroom bias, 2) using a baseline upscaler modality for power-bias, 3) using a highest quality of upscaler modality that is supported by the APU 102 up to a defined utilization threshold (e.g., at least 80 percent utilization capacity by the APU 102) for quality bias, or 4) using a baseline upscaler modality for speed-bias.

For the upscaler modality quality, the upscaler modalities can be based on a ranked or preferred level of quality. For example, the upscaler modalities can be ranked, selected, or arranged based on quality delivered. The upscaler modalities includes, for example, 1) a temporal-based super resolution to output resolution, 2) a temporal-based super resolution to near output resolution (i.e., less than 1.3 times upscaling each direction in display controller), 3) a spatial-only perception-based upscaling to output resolution, 4) a spatial-only perception-based upscaling to near output resolution, and 5) an improved RCAS on input resolution and algorithmic with overshoot/undershoot filters to near output resolution. The RCAS on input resolution and algorithmic with overshoot/undershoot filters to near output resolution.

Thus, the upscaling service, provided by the platform resource integrity service 210 selects a rendering operation on the dGPU 134, the APU 102, or both the dGPU 134 and the APU 102. The upscaling service, provided by the platform resource integrity service 210 selects the upscaling operation on the dGPU 134, the APU 102, or both the dGPU 134 and the APU 102. The upscaling service, provided by the platform resource integrity service 210 selects displaying operation on the dGPU 134, the APU 102, or both the dGPU 134 and the APU 102. For example, the platform resource integrity service 210 selects rendering on the dGPU 134, upscaling on the APU 102, and displaying using the display controller 124 of the APU 102. Alternatively, the platform resource integrity service 210 selects rendering on the dGPU 134, upscaling on the APU 102, and displaying using the display controller 154 of the dGPU 134. In another aspect, the platform resource integrity service 210 selects the rendering on the dGPU 134, upscaling on the dGPU 134, and displaying using the display controller 154 of the dGPU 134. In an additional aspect, the platform resource integrity service 210 selects the rendering on the APU 102, upscaling on the APU 102, and displaying using the display controller 124 of the APU 102.

To further illustrate, consider the following example operations. As a preliminary matter, in each of the examples, the platform resource integrity service 210, using the platform component 240, performs static and dynamic platform resources check (e.g., analyze the capabilities). The smart shift 242 provides to the platform resource integrity service 210 power, performance, thermals, and policies relating to the capabilities of the platform resources such as, for example, the APU 102 and the dGPU 134.

In a first example, assume that the platform resource integrity service 210 selects the dGPU 134 to perform the rendering operation and selects the APU 102 for displaying a gaming application (e.g., image display). In one aspect, the platform resource integrity service 210 makes this selection if the user preference desires or intends to maximize frame rate and ray tracing. However, ray tracing can negatively impact the frame rate when the spatial resolution is lowered. Thus, the ray tracing with frame results in the tradeoff results of achieving a higher frame rate while sacrificing spatial resolution. Thus, in this example, the user indicates the preference of selecting to maximize frame rate (e.g., to achieve a highest frame rate) but this choice results in the decreased quality of spatial resolution.

In this scenario, the platform resource integrity service 210 selects the APU 102 to restore the spatial resolution. In this way, the platform resource integrity service 210 determines which of the platform resources to use based on the user preference. For example, the platform resource integrity service 210 can learn or determine that the user indicates a preference for higher frame rate compromising images details or can learn or determine the user indicates a preference for maximum detail such as, for example, high resolution video (e.g., "4K" video) and the user is satisfied with suboptimal frame rate or has no preference about ray tracing. In one aspect, the workload request provides the user preference while a machine learning operation can be performed by the platform resource integrity service 210 to learn the user behavior based on historical data.

Thus, in this example, a game is executed (e.g., played) on the dGPU 134 with a lower resolution than a current display setting of the display 542B. In this scenario, the rendered image is processed for upscaling and post processing. In one aspect, post processing can be the sharpening of the image, adjusting the color grade, or any other processing operation required after the dGPU 134 is finished rendering. The GPU compute engine 140, on the on the dGPU 134, can perform a selected upscaling operation such as, for example, a temporal reconstruction super-sampling (TRSS).

Again, in operation, the played game is rendered it on the dGPU 134, and then other upscaling workloads transferred/sent over to the APU 102 for display such as, for example, using the display controller 124. The APU 102, at the direction of the platform resource integrity service 210, provides an advanced upscaling operation, a machine-learning inference-based upscaling, or shader upscaling (based on the APU 102 capabilities and user preference) along with post processing performed by the APU 102. In one aspect, the APU 102, for post processing, can perform an image sharpening since the image was rendered at lower resolution. The images are then sharpened and upscaled in the display pipe (e.g., a display core next "DCN" scale) such as, for example, using the display controller 124 of the APU.

In a second example, assume the dGPU 134 is high powered and provides a low latency output. In this scenario, the platform resource integrity service 210 selects the dGPU 134 to execute a full frame rate gameplay and output (optionally) on the dGPU 134 or output on the APU 102 in a hybrid graphics situation.

In a third example, assume a user preference is to use an advanced upscaler so instead of using a basic upscaler such as, for example, an advanced machine learning inference based upscaling. In the event the dGPU 134 lacks the capability to execute the advanced machine learning inference based upscaling, the platform resource integrity service 210 selects the APU 102 to upscale now in the specialized modality of ed machine learning inference based upscaling, where the APU 102 includes an inference processor unit (e.g., a machine learning component that is not shown) and can do upscaling either using the full complement of shaders or can do the upscaling based on inference processing unit and that yield a better or increase result of the upscale. Thus, in this third example, a game can be played on the dGPU 134 and the APU 102 performs the machine learning inference upscaler and then post processing can also occur on the APU 102 with additional sharpening of the image. In this way, the APU 102 uses a machine learning for upscaling and then you're using shaders (e.g., the GPU compute engine 110 on the APU 102) for further postprocessing.

In a fourth example, assume a user preference is to execute an application such as, for example, playing a game at a lowest power. The platform resource integrity service 210 can elect to play the game on the APU 102 and output on the APU 102 while completely ignoring the dGPU 134. As such, this example illustrates how the operations described herein for platform resource recommendation can work in conjunction with the smart upscaler. For example, the platform resource integrity service 210 provides a recommendation to switch platform resources based on the low battery and hint or suggest moving all operations from the dGPU 134 to the APU 102 and ignore the dGPU 134 to continue playing the game.

In summary, the platform resource integrity service 210 identifies the platform capabilities of each platform. The platform resource integrity service 210 can, using smart upscaling, then determine the modality of the upscaling (e.g., how to do the upscaling) based on the operating conditions. That is, the platform resource integrity service 210 understands and determines which of the platform resources to perform the upscaling based the user preference and platform capabilities of the APU 102 and the dGPU 134. For example, if the dGPU 134 is tuned to a specific upscale ratio, the platform resource integrity service 210 is able to determine what, if any, other platform resources can be selected and used if the user indicates a preference to change, for example, the aspect ratio, or indicated a preference wanted to use a different scale ratio, or indicated a preference wanted to offset some consequences of upscale such as, for example ringing or aliased lines and then use shaders to post process. In this way, the platform resource integrity service 210 can dynamically assign upscaling workloads of the upscaling operation to the APU 102, the dGPU 134, or both based on at least a modality of the upscaling operation, the platform capabilities, and user preferences. The APU 102, the dGPU 134, or both can then process the workloads of the upscaling operation based on dynamically assigning the workloads.

Figure 7:
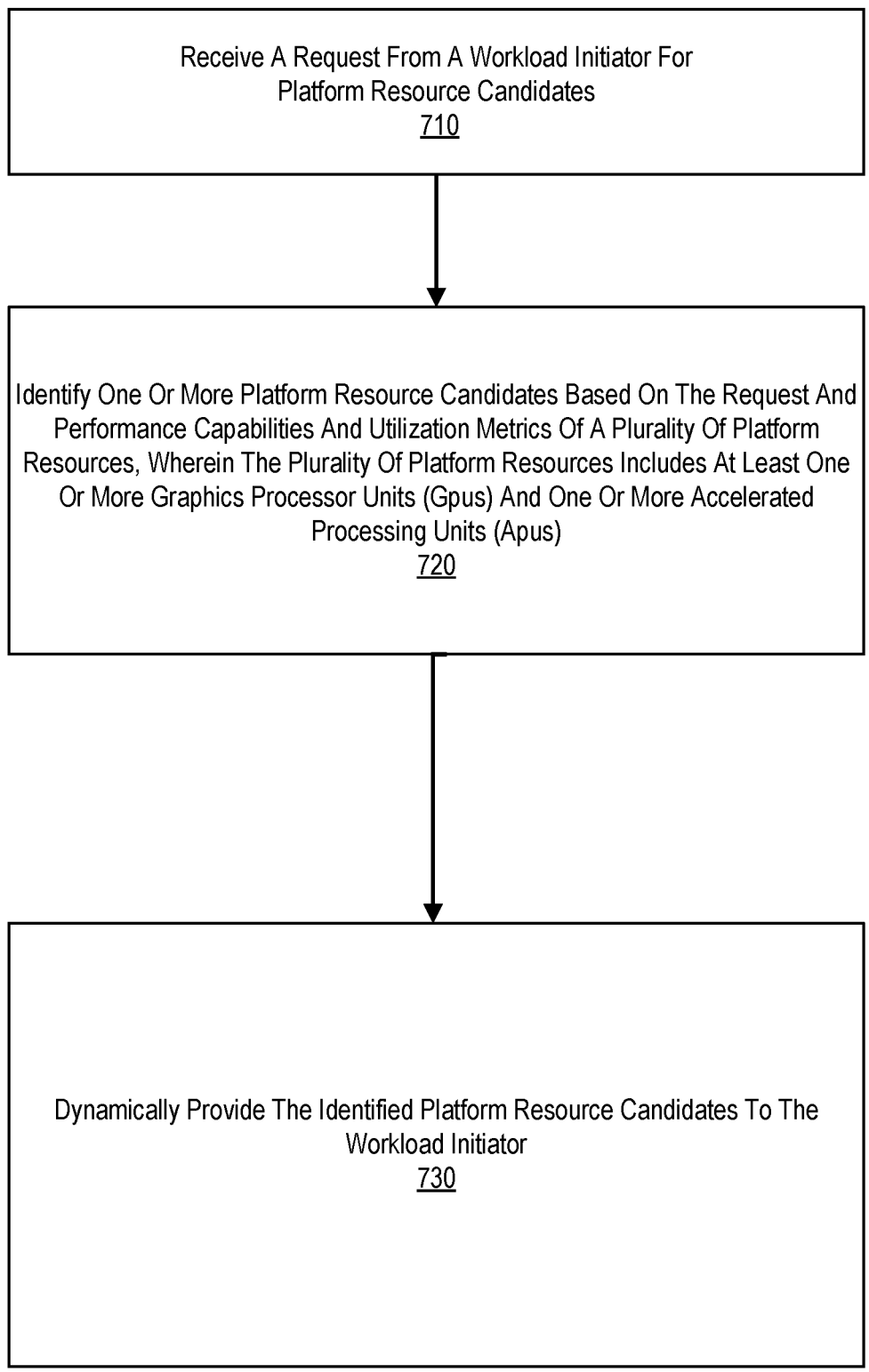
FIG. 7 sets forth a flow chart illustrating an example method of providing platform resource candidates to a workload initiator in accordance with some implementations of the present disclosure.

For further explanation, FIG. 7 sets forth a flow chart illustrating an example method of providing platform resource candidates to a workload initiator in accordance with some implementations of the present disclosure. The example method of FIG. 7 includes receiving 710 a request from a workload initiator for a platform resource recommendation. In some examples, the request can be for information indicating where the workload should be placed among the processing resources capable of executing the workload. For example, where the workload includes video processing or graphics processing tasks, a computing system (e.g., the system 100 of FIG. 1) that that executes the workload includes multiple GPUs capable of executing the workload. In a particular example, the computing system includes an integrated GPU (e.g., the integrated GPU 104 of FIG. 1) and a discrete GPU (e.g., the dGPU 134 of FIG. 1). In such an example, the request from the workload initiator is a query to the platform resource integrity service 210 for a recommendation or "hint" where a workload should be placed on the integrated GPU or the discrete GPU, or a combination thereof. In some cases, the workload includes work items that can be executed on the integrated GPU and other work items that can be executed on the discrete GPU concurrently.

Various types of applications can be workload initiators, each with a variety of types of workloads. In some examples, the request from the workload initiator describes the type of workload, workload characteristics, processing requirements, and/or the performance expectations for the workload. For example, a media player application can have a media playback workload that it intends to run on the computing system. In such an example, the description of the workload includes the source resolution, display resolution, bit rate, video codec, audio codec, and frame rate for the playback workload. As another example, a video conference application can have a transcode workload that is intends to run the computing system. In such an example, the description of the workload includes a source video codec, and target video codec, and a frame rate. The video conferencing application can also include an artificial intelligence (AI) workload that includes AI algorithms for gaze correction or removing/substituting a participant's background on screen.

The example method of FIG. 7 also includes identifying 720 one or more platform resource candidates based on the request and performance capabilities and utilization metrics of a plurality of platform resources. The platform resources include one or more GPUs and one or more APUs. In some examples, identifying 720 the one or more platform resource candidates is carried out by collecting static and dynamic capabilities along with runtime utilization metrics from the APUs and dGPU, including capabilities and utilization metrics of the integrated GPU compute engine (e.g., the integrated GPU compute engine 110 of FIG. 1) and the discrete GPU compute engine (e.g., the discrete GPU compute engine 140 of FIG. 1).

The capabilities of the APU and dGPU can be expressed in a variety of ways that will be recognized by those of skill in the art. For example, the platform capabilities includes processing speeds, power states, engine utilization, memory controller/PCIe utilization and capabilities, power limitations or constraints, upscaling capabilities and limitations, rendering capabilities and limitations, and display capabilities and limitations. The platform capabilities can include video enhancement capabilities and artificial intelligence (AI) features for video/teleconference call or streaming. The platform capabilities includes the ability to execute various types of modalities of a workload or application such as, for example, upscaling, rendering, or displaying. The platform capabilities include the ability to process workloads in low battery mode such as, for example, executing a gaming application at a lowest power consumption.

In some examples, identifying 720 one or more platform resource candidates is carried out based on performance factors for the platform resources capabilities where one processor resource performs a task better than another. In one example, the platform resource integrity service 210 determines that a gaming workload should be placed on the discrete GPU as long as the gaming workload is not predicted to result in oversubscription of the discrete GPU. In another aspect, the platform resource integrity service 210 determines that video playback should be performed using the audio codec 122. It can be the case that one of the GPUs includes an audio codec 122 accelerator while the other does not.

The utilization of the APU and the dGPU can be expressed in a variety of ways that will be recognized by those of skill in the art. For example, the utilization metrics of the APU and the dGPU includes processor utilization as a ratio of idle time to busy time, as a number of active processes, as a number of active threads, as power consumption, or combinations thereof. The integrated GPU and the discrete GPU includes various counters for providing these metrics.

The example method of FIG. 7 also includes dynamically providing 730 the identified platform resource candidates to the workload initiator. In some examples, dynamically providing 730 the identified platform resource candidates to the workload initiator is carried out by the platform resource integrity service 210 sending a notification to the workload initiator that includes the identified platform resource candidates.

In an additional example, the platform resource recommendation includes a recommendation to select at least one of the plurality of platform resources to execute the workload upon at least two of the plurality of platform resources are available to execute the workload. For example, the recommendation or a resource hint includes a hint or recommendation for which platform resources (e.g., a GPU, an APU, etc.) to put the workload on and can also provide a recommendation/resource hint for which platform resources to use when multiple options are available.

Figure 8:
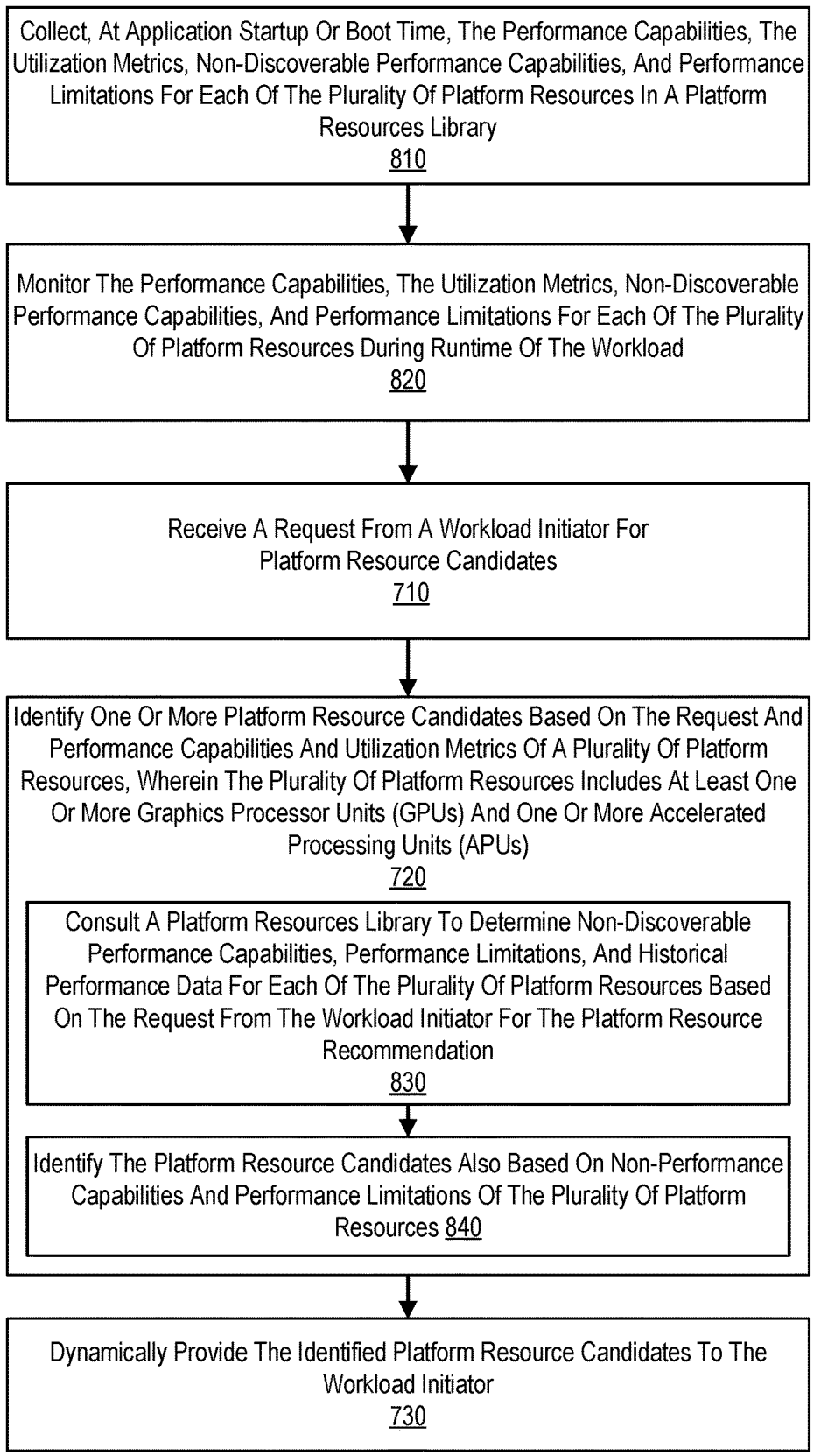
FIG. 8 sets forth a flow chart illustrating another example method of providing platform resource candidates to a workload initiator in accordance with some implementations of the present disclosure.

For further explanation, FIG. 8 sets forth a flow chart illustrating another example method of providing platform resource candidates to a workload initiator in accordance with some implementations of the present disclosure. The method of FIG. 8 is similar to the method of FIG. 7, except that the method of FIG. 8 also includes collecting 810, in a platform resources library, performance capabilities, utilization metrics, non-discoverable performance capabilities, and performance limitations for each of the platform resources (referred to collectively as the 'parameters' or 'metrics' for ease of reference). Such collection 810 of parameters is carried out at start up of a workload or boot time of a system as an initial 'discovery' task. Collecting the parameters can include collecting information about a platform's hardware resources.

Upon an operating system boot, or a first run of an application, the platform resources library 312 executes a platform resource discovery operation and determines all available platform information. The platform resources library 312 then cross-checks the discovery data against resource platform records (described above as 340) to build a complete static, platform resources capability list of the system 300. The static, platform resources capability list can be stored in a manner so as to be accessible by the platform resources library 312. In contrast, for dynamic operations (e.g., for determining current system 300 status, load, and per GPU engine use), the platform resources library 312 collects, gathers, processes, stores and monitors current platform resource metrics or parameters. The platform resource utilization metrics can also be collected for each platform resource (e.g., each engine/core) load in an available dynamic load range. Such a dynamic load range can be based on any platform resource capabilities or limitations. Such capabilities or limitations can be due to a type of operational mode, limitations based on memory bandwidths, or system interconnection loads.

The method of FIG. 8 also includes monitoring 820 the performance capabilities, the utilization metrics, non-discoverable performance capabilities, and performance limitations for each of the plurality of platform resources during runtime of the workload. That is, after the initial discovery process and setting up a baseline for the resource utilization metrics, the system can monitor and update the metrics with real-time utilization and capabilities of the resources. As part of the monitoring, the platform resource integrity service 210 can utilize a platform state change listener 327 that monitors and listens for a variety of events specified in a list of system or driver events. The list of events can increase and grow over time. In one aspect, the platform state change listener 327 monitors and listens for a variety of essential events that must always be registered with the platform resource library 312. Such essential events include, for example, an alternating current/direct current (AC/DC) switch event, an addition or removal of a platform resource, a change to a power envelope based on a user request via a power source (e.g., a battery/performance slider) or a change to control panel settings. Changes to a control panel setting can include, for example, changes to AC and DC modes. These monitored events provide real-time data to the platform resource integrity service 210 and can better inform the identification 720 of platform resource candidates.

Also, in the method of FIG. 8, identifying 720 platform resource candidates includes consulting 830 the platform resources library to determine non-discoverable performance capabilities, performance limitations, and historical performance data for each of the plurality of platform resources based on the request from the workload initiator for the platform resource recommendation. The platform resource integrity service 210 deploys the platform resources library 312 that includes a set of records such as, for example, records 340. The records 340 can be resource platform records with a comprehensive resource platform dataset that includes a complete list of platform resource capabilities (including capabilities non-discoverable by an operating system), limitations, performance metrics, and historical data. The records 340 can be used by the platform resources library 312 as read-only. The records 340 can be provided in the platform resources library 312 from original equipment manufacturers (OEMs) and from platform supplementary information.

After consulting 830 the platform resources library, the method of FIG. 8 continues by identifying 840 the platform resource candidates based on non-performance capabilities and performance limitations of the plurality of platform resources. That is, in addition to performance capabilities, resource candidate identification may also rely on non-performance capabilities as well as performance limitations.

Figure 9:
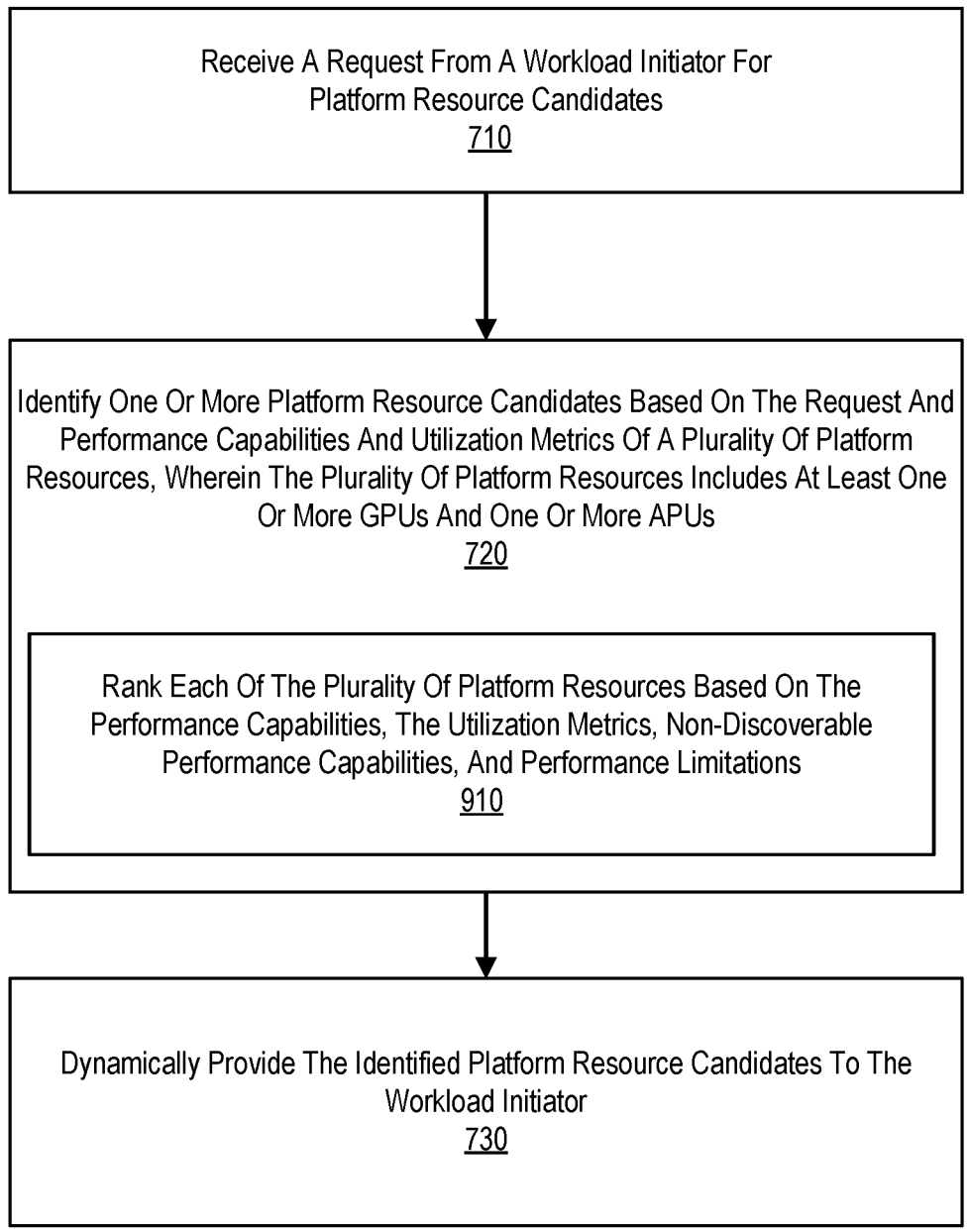
FIG. 9 sets forth a flow chart illustrating another example method of providing platform resource candidates to a workload initiator in accordance with some implementations of the present disclosure.

For further explanation, FIG. 9 sets forth a flow chart illustrating another example method of providing platform resource candidates to a workload initiator in accordance with some implementations of the present disclosure. The method of FIG. 9 is similar to the method of FIG. 7, except that the method of FIG. 9 includes ranking 910 each of the plurality of platform resources based on the performance capabilities, the utilization metrics, non-discoverable performance capabilities, and performance limitations. In some examples, ranking 910 each of the plurality of platform resources based on the performance capabilities, the utilization metrics, non-discoverable performance capabilities, and performance limitations is carried out by the platform resource integrity service 210 by ranking the performance capabilities, the utilization metrics, non-discoverable performance capabilities, and performance limitations based on the ability of the APU 102 or the dGPU to 1) deliver a maximum frame rate and/or highest quality possible under the maximum platform capacity allowed by the APU 102 or the dGPU, 2) a memory bandwidth, 3) compute bandwidth, 4) the ability or capacity to maintain a frame rate for real-time various types of use cases, 5) the capacity and ability to conserve energy such as, for example, the ability to carry out a workload based on a lowest power option or the highest performance option, the capacity to minimize memory transfers between the APU 102 or the dGPU, and 6) the ability to minimize a memory footprint. It should be noted that user preferences can be used also for ranking the capacities.

Figure 10:
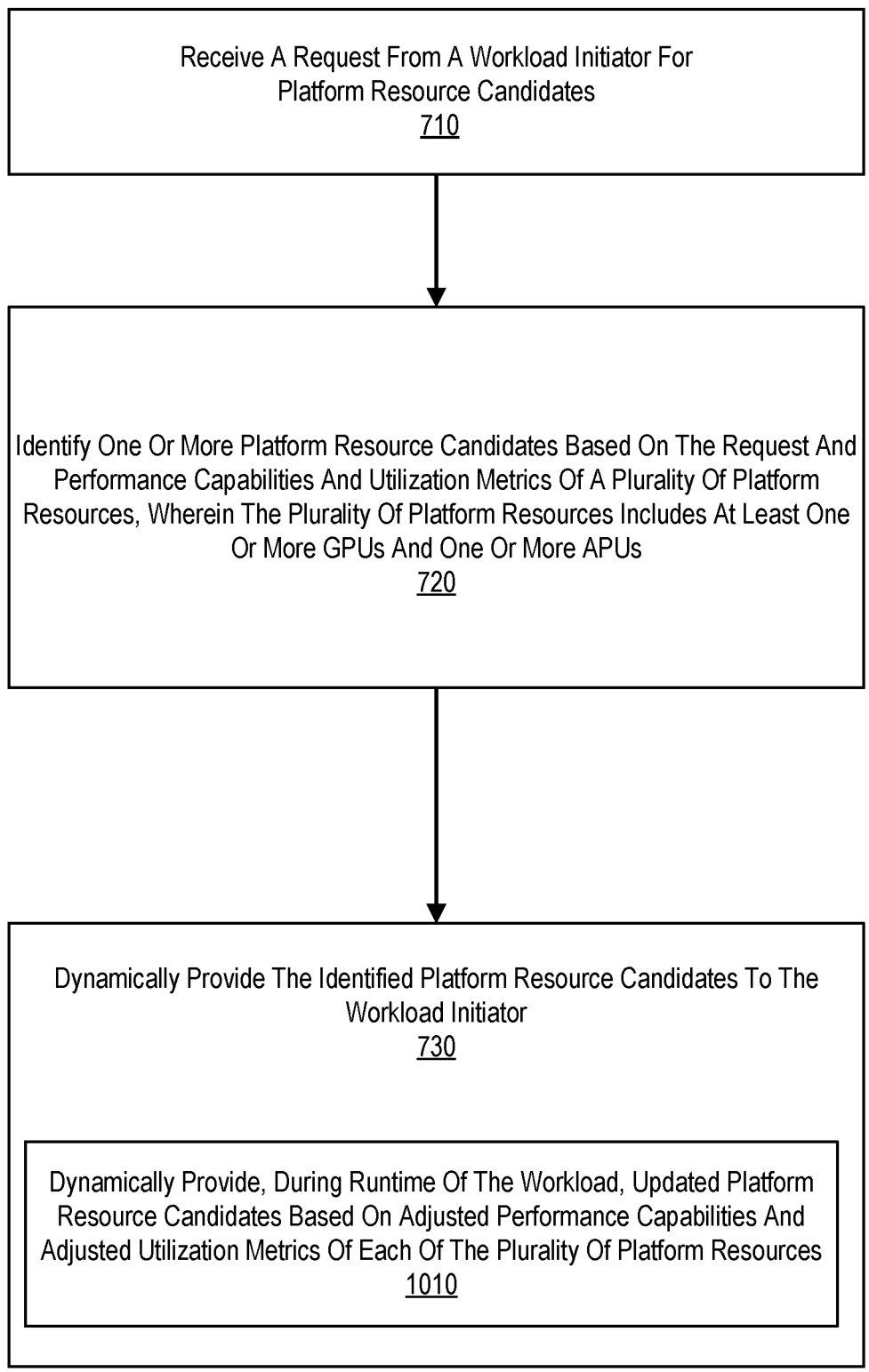
FIG. 10 sets forth a flow chart illustrating an example method in which platform resource candidates are updated during runtime according to implementations of the present disclosure.

During operation of a system, resource utilization and capabilities change. To that end, FIG. 10 sets forth a flow chart illustrating an example method in which platform resource candidates are updated during runtime according to implementations of the present disclosure. The method of FIG. 10 is similar to that of FIG. 7, except that the method of FIG. 10 also includes dynamically providing 1010, during runtime of the workload, updated platform resource candidates based on adjusted performance capabilities and adjusted utilization metrics of the plurality of platform resources. In some examples, dynamically providing 1010 updated platform resource candidates is carried out by providing an updated recommendation to the workload initiator to reallocate platform resources. For example, when a change is detected in a platform resource, which was provided in the previously provided set of resource candidates, the platform resource candidates can be re-identified based on the detected change and an updated recommendation of resource candidates can be provided to the workload initiator. Such changes can include, for example, a change in performance, the number of active processes, a number of active threads, loss or gain in power consumption, or combinations thereof.

Figure 11:
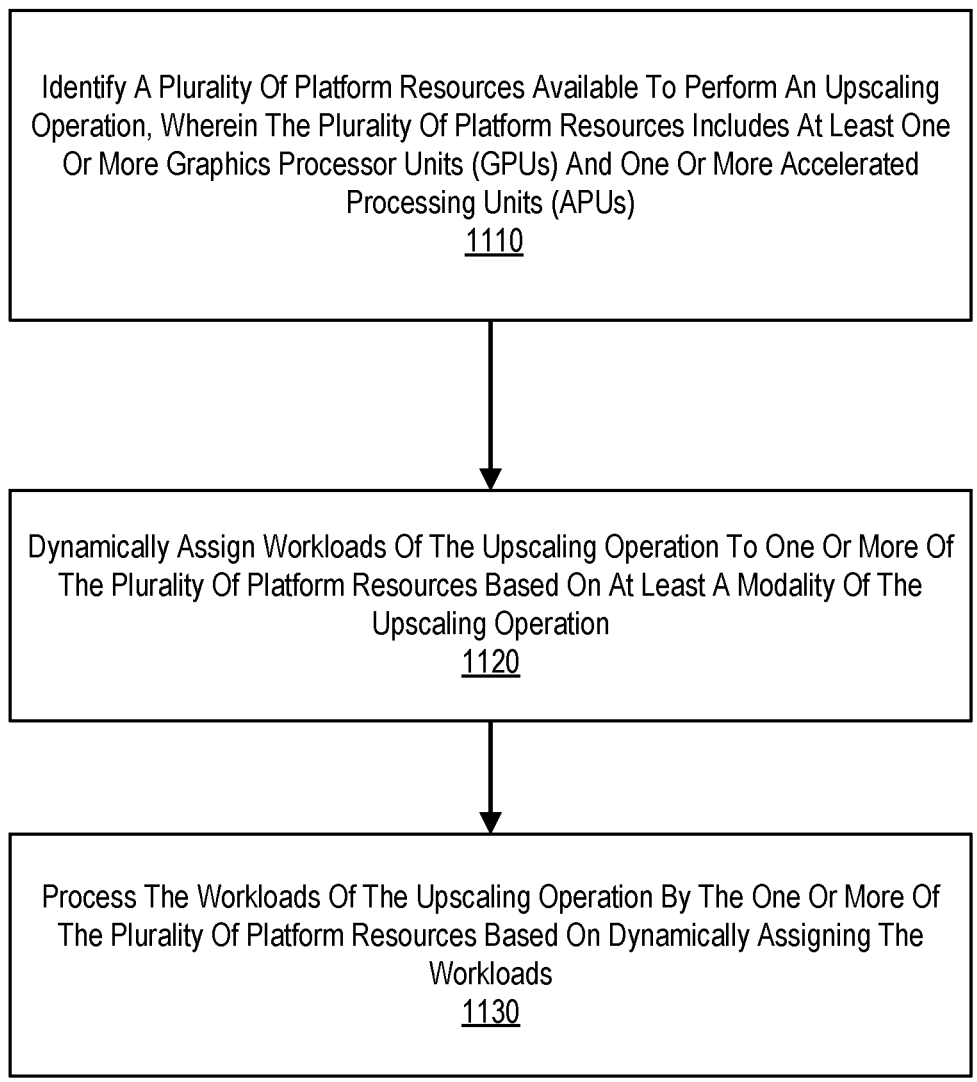
FIG. 11 sets forth a flow chart illustrating an example method of compound processing of an upscaling operation of a rendered frame using a platform resource recommendation service (e.g., a platform resource integrity service) in accordance with some implementations of the present disclosure.

For further explanation, FIG. 11 sets forth a flow chart illustrating an example method of compound processing of an upscaling operation of a rendered frame using a platform resource recommendation service in accordance with some implementations of the present disclosure. It should be noted, as described herein a scaling operation or "upscaling" can also include downscaling such as, for example, when a frame is rendered with a higher resolution than is presented to an end-user. Thus, in general, a scaling operation can also include image processing (e.g., image sharpening) without scaling, along with scaling operation, or independently, without scaling, in a cross-device manner.

The example method of FIG. 11 includes identifying 1110 a plurality of platform resources available to perform an upscaling operation (of a rendered frame), where the resources include (at least) one or more GPUs and one or more APUs. In some examples, identifying 1110 a plurality of platform resources available to perform an upscaling operation by dynamically identifying the availability of the dGPU 134 and the APU 102 to upscale data.

The example method of FIG. 11 also includes dynamically assigning 1120 workloads of the upscaling operation to one or more of the plurality of platform resources based on at least a modality of the upscaling operation. In some examples, dynamically assigning 1120 the workloads to one or more of the platform resources is carried out by the platform resource integrity service 210 spreading rasterization and upscaling workloads between the APUs and dGPU. That is, the platform resource integrity service 210 can spread the rasterization and upscaling workloads between the APUs and dGPU based on capabilities and utilization metrics of the integrated GPU compute engine (e.g., the integrated GPU compute engine 110 of FIG. 1) and the discrete GPU compute engine (e.g., the discrete GPU compute engine 140 of FIG. 1).

The example method of FIG. 11 also includes processing 1130 the workloads of the upscaling operation by the one or more of the plurality of platform resources based on dynamically assigning the workloads. In some examples, processing 1130 the workloads of the upscaling operation by the one or more of the plurality of platform resources based on dynamically assigning the workloads is carried out by indicating to the particular platform resource that upscaling operations are assigned to the APU 102, the dGPU 134, or both. Based upon the indication, the APU 102, the dGPU 134, or both can carry out the process.

Figure 12:
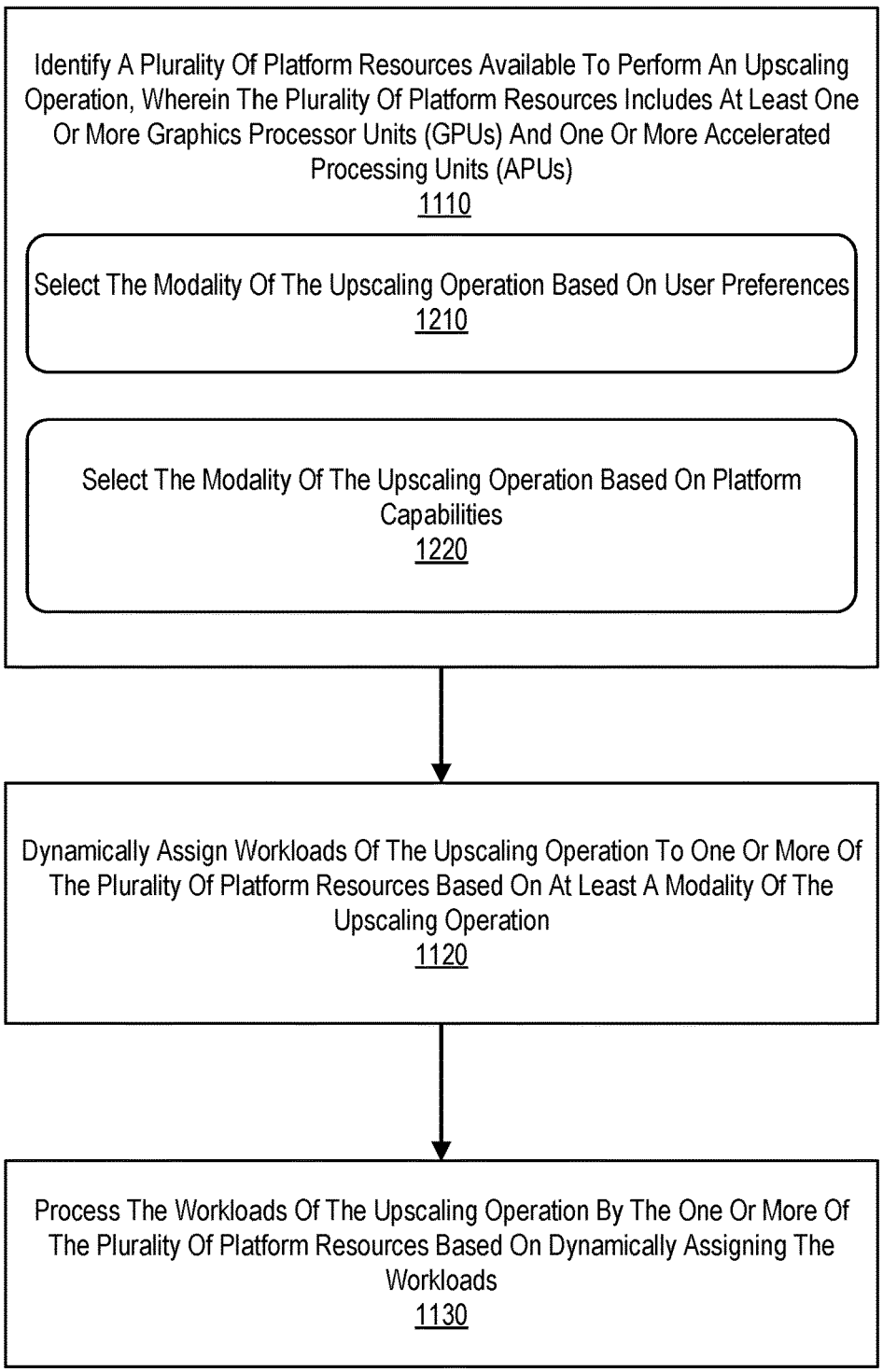
FIG. 12 sets forth a flow chart illustrating another example method of compound processing of an upscaling operation of a rendered frame using a platform resource recommendation service in accordance with some implementations of the present disclosure.

For further explanation, FIG. 12 sets forth a flow chart illustrating another example method of compound processing of an upscaling operation of a rendered frame using a platform resource recommendation service in accordance with some implementations of the present disclosure. The method of FIG. 12 is similar to the method of FIG. 11, except that, the method of FIG. 12 sets forth alternative implementations of identifying 1110 platform resources available to perform an upscaling operation. In one implementation, the method includes selecting 1210 the modality of the upscaling operation based on user preferences. In some examples, selecting 1210 the modality of the upscaling operation based on user preferences is carried out by identifying or learning (via a machine learning operation) a user preference for upscaling and selecting the modality of the upscaling operation. For example, the modality of the upscaling operation can be a nearest-neighbor interpolation, bilinear (basic interpolation), and bicubic algorithms (complex interpolation) based on the user preference or learned user profile.

In another implementation, the identification 1110 of platform resources available to perform an upscaling operation includes selecting 1220 the modality of the upscaling operation based on performance capabilities of the one or more of the plurality of platform resources. In some examples, selecting 1210 the modality of the upscaling operation based on performance capabilities of the one or more of the plurality of platform resources is carried out by identifying or learning (via a machine learning operation) performance capabilities of the one or more of the plurality of platform resources for upscaling and selecting the modality of the upscaling operation.

Like identification 1110 of the platform resources can be carried out in a variety of ways, so too can assignment of workloads. To that end, FIG. 13 sets forth a flow chart illustrating another example method of compound processing of an upscaling operation in which assignment of workloads is carried out in a number of different ways in accordance with some implementations of the present disclosure. More specifically, the example method of FIG. 13 includes dynamically assigning 1310 workloads based on user preferences and dynamically assigning 1320 workloads based on performance capabilities of the plurality of platform resources.

In some examples, dynamically assigning 1310 workloads of the upscaling operation (of a rendered frame) is carried out by selecting a rendering operation, an upscaling operation, and a display operation on the APU 102, the dGPU 134, or both depending on the user preferences. For example, for a user preference that specifies execution of a gaming application at a lowest power, the platform resource integrity service 210 provides a recommendation to execute all operations on the APU 102 and ignores the dGPU 143 in order to continue playing the game while on low power mode. In another example, if the user preferences are to maximize frame rate with ray tracing, the platform resource integrity service 210 can utilize the dGPU 134 to render an image at a lower spatial unit, while assigning to the APU 102 the workflow task to restore the lower resolution rendering back to high-resolution. Such restoration can include filtering such as edge enhancement to provide flexibility for upscaling by selecting the appropriate upscaling algorithm based on user preferences and platform capabilities.

The example method of FIG. 13 also includes dynamically assigning 1320 workloads of based on performance capabilities of the platform resources. In some examples, assigning 1320 workloads based on performance capabilities of the platform resources is carried out by selecting a rendering operation, an upscaling operation, and a display operation on the APU 102, the dGPU 134, or both depending on the platform capabilities of the APU 102 and the dGPU 134. For example, the APU 102, the dGPU 134, or both can be selected to perform rasterization or upscaling by determining, based on one or more policies, that the workload assigned to the resource or resources does not result in oversubscription of the resources. As an example, a policy can state that a dGPU can be recommended for upscaling workloads to be placed thereon if possible due to the ability to maximize frame rate while the rendering and displaying can be assigned to APU with the added workload so long as either the APU 102, the dGPU 134, or both are not oversubscribed. For example, such policies specify preferences for where the upscaling workload or components of the upscaling workload should be placed, enumerated priorities for aspects of the workload (e.g., speed, power consumption, image quality, etc.), base requirements for the workload (e.g., frame rate, latency, output resolution), critical resources for the workload (e.g., which resources are heavily utilized by the workload), security and protection policies, and so on.

The policies can require assigning workloads of the upscaling operations to the APU 102, the dGPU 134, or both based on the policy to: 1) deliver a maximum frame rate and/or highest quality possible under the maximum platform capacity allowed by the APU 102 or the dGPU, 2) assign based on a memory bandwidth, 3) prioritize based on compute bandwidth, 4) assign based on the ability or capacity to maintain a frame rate for real-time various types of use cases, 5) assign based the capacity and ability to conserve energy such as, for example, the ability to carry out a workload based on a lowest power option or the highest performance option, the capacity to minimize memory transfers between the APU 102 or the dGPU, and 6) assign based on the ability to minimize a memory footprint.

Additionally, assigning a rendering operation, the upscaling operation, and a display operation of the workloads between the one or more of the plurality of platform resources can be based on the power state (e.g., a change from AC to DC power or a change from DC to AC power) of the one or more of the plurality of platform resources, and performance capabilities of the one or more of the plurality of platform resources.

In view of the foregoing, readers of skill in the art will appreciate that implementations in accordance with the present disclosure offer a number of advantages. Implementations provide applications that intend to initiate workloads on a multi-GPU system with visibility into the runtime behavior of the system, such that the application does not place workloads on resources that are overutilized. Further, policies for features/workload types provide a definition that allows a policy engine of the resource manager to make the optimal workload allocation recommendation for that feature/workload type. Thus, the system can guarantee that the workload will be performed as expected, or the application will be notified prior to initiating workload that performance cannot be guaranteed. In this way, the user experience is improved.

Implementations allow memory-local computing to be used efficiently for atomic operations, which can improve performance for a range of important workloads (e.g., graph analytics, sparse matrix algebra, machine learning, etc.). Such applications can take advantage of cache locality when available, and dynamically identify coalescing opportunities to enable more efficient multi-module memory-local processing operations.

Implementations can be a system, an apparatus, a method, and/or logic circuitry. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some implementations, electronic circuitry including, for example, programmable logic circuitry, field-programmable gate arrays (FPGA), or programmable logic arrays (PLA) executes the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A method of providing platform resource candidates, the method comprising:
   identifying one or more platform resource candidates from a plurality of platform resources based on a request received from a workload initiator for platform resource candidates, performance capabilities of the plurality of platform resources, utilization metrics of the plurality of platform resources, and non-discoverable performance capabilities that are non-discoverable by an operating system, wherein the plurality of platform resources includes one or more graphics processor units (GPUs) and one or more accelerated processing units (APUs); and
   dynamically providing a recommendation including the identified one or more platform resource candidates to the workload initiator.

2. The method of claim 1, wherein the platform resource candidates are also identified based on non-performance capabilities and performance limitations of the plurality of platform resources.

3. The method of claim 1, further comprising collecting the performance capabilities, the utilization metrics, the non-discoverable performance capabilities that are non-discoverable by an operating system, and performance limitations for the plurality of platform resources in a platform resources library.

4. The method of claim 1, further comprising consulting a platform resources library to determine the non-discoverable performance capabilities that are non-discoverable by an operating system, performance limitations, and historical performance data for the plurality of platform resources based on the request from the workload initiator.

5. The method of claim 1, further comprising monitoring the performance capabilities, the utilization metrics, the non-discoverable performance capabilities that are non-discoverable by an operating system, and performance limitations for the plurality of platform resources during runtime of the workload.

6. The method of claim 1, further comprising dynamically providing, during runtime of the workload, updated platform resource candidates based on adjusted performance capabilities and adjusted utilization metrics of the plurality of platform resources.

7. The method of claim 1, further comprising ranking each of the plurality of platform resources based on the performance capabilities, the utilization metrics, the non-discoverable performance capabilities that are non-discoverable by an operating system, and performance limitations.

8. The method of claim 1, further comprising predicting a utilization impact to execute the workload for each of the plurality of platform resources based on the performance capabilities, the utilization metrics, the non-discoverable performance capabilities that are non-discoverable by an operating system, and performance limitations.

9. The method of claim 1, wherein the performance capabilities include operational modes of the plurality of platform resources, interconnection capabilities between the plurality of platform resources, power capabilities of the plurality of platform resources, and peripheral device capabilities.

10. The method of claim 1, wherein the plurality of platform resources further includes a local memory, a system memory, one or more peripheral devices, a display controller, a bus interface controller, and a memory subsystem controller, wherein at least one of the one or more GPUs is a discrete GPU.

11. An apparatus of providing platform resource candidates, the apparatus comprising a computer processor, a computer memory operatively coupled to the computer processor, the computer memory having disposed therein computer program instructions that, when executed by the computer processor, cause the apparatus to:
   identify one or more platform resource candidates from a plurality of platform resources based on a request received from a workload initiator for platform resource candidates, performance capabilities and utilization metrics of the plurality of platform resources, and non-discoverable performance capabilities that are non-discoverable by an operating system, wherein the plurality of platform resources includes one or more graphics processor units (GPUs) and one or more accelerated processing units (APUs); and
   dynamically provide a recommendation including the identified one or more platform resource candidates to the workload initiator.

12. The apparatus of claim 11, further comprising computer program instructions that, when executed, cause the apparatus to consult a platform resources library to determine the non-discoverable performance capabilities that are non-discoverable by an operating system, performance limitations, and historical performance data for the plurality of platform resources based on the request from the workload initiator.

13. The apparatus of claim 11, further comprising computer program instructions that, when executed, cause the apparatus to monitor the performance capabilities, the utilization metrics, the non-discoverable performance capabilities that are non-discoverable by an operating system, and performance limitations for the plurality of platform resources during runtime of the workload.

14. The apparatus of claim 11, further comprising computer program instructions that, when executed, cause the apparatus to dynamically provide, during runtime of the workload, updated platform resource candidates based on adjusted performance capabilities and adjusted utilization metrics of the plurality of platform resources.

15. The apparatus of claim 11, further comprising computer program instructions that, when executed, cause the apparatus to rank each of the plurality of platform resources based on the performance capabilities, the utilization metrics, the non-discoverable performance capabilities that are non-discoverable by an operating system, and performance limitations.

16. The apparatus of claim 11, further comprising computer program instructions that, when executed, cause the apparatus to predict a utilization impact to execute the workload for each of the plurality of platform resources based on the performance capabilities, the utilization metrics, the non-discoverable performance capabilities that are non-discoverable by an operating system, and performance limitations.

17. A computer program product of providing platform resource candidates, the computer program product disposed upon a non-transitory computer readable medium, the computer program product comprising computer program instructions that, when executed, cause a computer to:

identify one or more platform resource candidates from a plurality of platform resources based on a request received from a workload initiator for platform resource candidates, performance capabilities and utilization metrics of the plurality of platform resources, and non-discoverable performance capabilities that are non-discoverable by an operating system, wherein the plurality of platform resources includes one or more graphics processor units (GPUs) and one or more accelerated processing units (APUs); and dynamically provide a recommendation including the identified one or more platform resource candidates to the workload initiator.

18. The computer program product of claim 17, wherein the platform resource candidates are also identified based on the identified one or more platform resource candidates based on non-performance capabilities and performance limitations of the plurality of platform resources.

19. The computer program product of claim 17, further comprising computer program instructions that, when executed, cause the computer to:

consult a platform resources library to determine the non-discoverable performance capabilities that are non-discoverable by an operating system, performance limitations, and historical performance data for the plurality of platform resources based on the request from the workload initiator.

20. The computer program product of claim 17, further comprising computer program instructions that, when executed, cause the computer to:

dynamically provide, during runtime of the workload, updated platform resource candidates based on adjusted performance capabilities and adjusted utilization metrics of the plurality of platform resources.

* * * * *